United States Patent
Hirschmann et al.

(10) Patent No.: US 7,041,347 B2
(45) Date of Patent: May 9, 2006

(54) 1,4-DI-(TRANS-4-CYCLOHEXYL)BENZENE DERIVATIVES AND THEIR USE IN LIQUID CRYSTAL MEDIA AND LIQUID CRYSTAL DEVICES

(75) Inventors: Harald Hirschmann, Darmstadt (DE); Martina Weidner, Münster (DE); Sven Schüpfer, Aschaffenburg (DE); Renate Graulich, Riedstadt (DE); Mark John Goulding, Hampshire (GB); Martin Heeney, Southampton (GB); Warren Duffy, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 74 days.

(21) Appl. No.: 10/777,201

(22) Filed: Feb. 13, 2004

(65) Prior Publication Data
US 2004/0164276 A1    Aug. 26, 2004

(30) Foreign Application Priority Data
Feb. 17, 2003   (EP) ................. 03003560

(51) Int. Cl.
| C09K 19/30 | (2006.01) |
| C09K 19/20 | (2006.01) |
| C09K 19/12 | (2006.01) |
| C07C 25/24 | (2006.01) |

(52) U.S. Cl. ............. 428/1.1; 252/299.63; 252/299.66; 252/299.67; 570/129

(58) Field of Classification Search .......... 252/299.63, 252/299.66, 299.67; 428/1.1; 570/129, 570/131; 349/182
See application file for complete search history.

(56) References Cited

U.S. PATENT DOCUMENTS

| 5,013,477 A | 5/1991 | Buchecker et al. |
| 5,185,098 A | 2/1993 | Buchecker et al. |
| 5,443,756 A | 8/1995 | Yoshida et al. |
| 6,063,456 A | 5/2000 | Hirschmann et al. |

FOREIGN PATENT DOCUMENTS

| DE | 4426799 | * | 2/1995 |
| EP | 0 479 199 | | 4/1992 |
| GB | 2 379 931 | | 3/2003 |

OTHER PUBLICATIONS

Bezborodov et al., "LC diketones: sysnthesis, transformations and mesomorphic propperties", Liquid Crystals, 2000, vol. 27, No. 7, pp. 935-941.*

* cited by examiner

*Primary Examiner*—Shean C. Wu
(74) *Attorney, Agent, or Firm*—Millen, White, Zelano & Branigan, P.C.

(57) ABSTRACT

Liquid-crystalline media comprising one or more compounds of the formula I

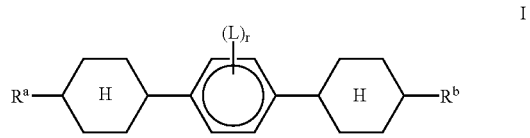

in which $R^a$, $R^b$, L and r are as defined herein, are suitable for use in, for example, TN and STN liquid crystal displays

33 Claims, No Drawings

1,4-DI-(TRANS-4-CYCLOHEXYL)BENZENE DERIVATIVES AND THEIR USE IN LIQUID CRYSTAL MEDIA AND LIQUID CRYSTAL DEVICES

The invention relates to the 1,4-di-(trans-4-cyclohexyl) benzene derivatives and their use in liquid crystal media and liquid crystal devices. The invention further relates to liquid crystal media and liquid crystal display devices comprising 1,4-di-(trans-4-cyclohexyl) benzene derivatives, in particular twisted nematic (TN) and supertwisted nematic (STN) liquid-crystal displays.

TN displays are known, for example, from M. Schadt and W. Helfrich, Appl. Phys. Lett., 18, 127 (1971). STN displays are known, for example, from EP 0 131 216 B1; DE 34 23 993 A1; EP 0 098 070 A2; M. Schadt and F. Leenhouts, 17th Freiburg Congress on Liquid Crystals (8.–10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term STN here covers any relatively highly twisted display element having a twist angle with a value of between 160° and 360°, such as, for example, the display elements according to Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. '50 (1987), 236), DST-LCDs (EP-A 0 246 842) or BW-STN-LCDs (K. Kawasaki et al., SID 87 Digest 391 (20.6)).

STN displays are distinguished, compared with standard TN displays, by significantly better steepnesses of the electro-optical characteristic line and, associated therewith, better contrast values, and by significantly lower angle dependence of the contrast.

Of particular interest are TN and STN displays having very short response times, in particular also at relatively low temperatures. In order to achieve short response times, the rotational viscosities of the liquid-crystal mixtures have hitherto been optimised using mostly monotropic additives having relatively high vapour pressure. However, the response times achieved were not adequate for every application.

In order to achieve a steep electro-optical characteristic line in the displays according to the invention, the liquid-crystal mixtures should have relatively large values for the ratio between the elastic constants $K_{33}/K_{11}$ and relatively small values for $\Delta\epsilon/\epsilon_{195}$, where $\Delta\epsilon$ is the dielectric anisotropy and $\epsilon_\perp$ is the dielectric constant perpendicular to the longitudinal molecular axis.

In addition to optimisation of the contrast and response times, further important requirements are made of mixtures of this type:
1. broad d/p window
2. high long-term chemical stability
3. high electrical resistance
4. low frequency and temperature dependence of the threshold voltage.

The parameter combinations achieved are still far from adequate, in particular for high-multiplex STN displays (with a multiplex rate in the region of about 1/400), but also for medium- and low-multiplex STN displays (with multiplex rates in the region of about 1/64 and 1/16 respectively), and TN displays. This is partly attributable to the fact that the various requirements are affected in opposite manners by material parameters.

Thus, there continues to be a great demand for TN and STN displays, in particular for medium- and low-multiplex STN displays, having very short response times at the same time as a large working-temperature range, high characteristic-line steepness, good angle dependence of the contrast and low threshold voltage which meet the above-mentioned requirements.

An object of the invention is to provide new compounds and liquid-crystalline media, in particular for TN and STN displays, which do not have the above-mentioned disadvantages or only do so to a lesser extent and at the same time have short response times, in particular at low temperatures, and very good steepnesses.

Upon further study of the specification and appended claims, further objects and advantages of this invention will become apparent to those skilled in the art.

It has now been found that these objects can be achieved if use is made of 1,4-di-(trans-4-cyclohexyl) benzene derivatives according to the present invention and liquid-crystal mixtures comprising them.

DE 44 26 799 mentions 1,4-di-(trans-4-cyclohexyl) benzene derivatives, but does not disclose the compounds or mixtures of the present invention.

The invention relates to a liquid crystalline mixture comprising one or more compounds of formula I

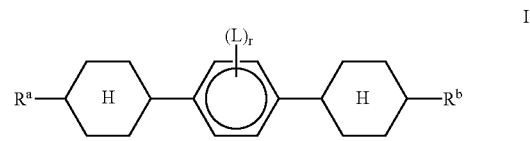

wherein
$R^a$ is an alkenyl group having from 2 to 9 carbon atoms,
$R^b$ is an alkyl group from 1 to 12 carbon atoms which is unsubstituted, monosubstituted by CN or $CF_3$ or at least monosubstituted by halogen, wherein one or more $CH_2$ groups in these groups may also each, independently of one another, be replaced by —O—, —S—, ⟨⟩, —CH=CH—, —C≡C—, —CO—, —CO—O—, —O—CO— or —O—CO—O— in such a way that O atoms are not linked directly to one another,
L is in each occurrence independently F, Cl, CN or an optionally mono- or polyhalogenated alkyl, alkoxy, alkenyl or alkenyloxy group having up to 3 carbon atoms, and
r is 0, 1, 2, 3 or 4.

The invention further relates to novel compounds of formula I.

The invention furthermore relates to a liquid-crystal display having
two outer plates, which, together with a frame, form a cell,
a nematic liquid-crystal mixture of positive dielectric anisotropy located in the cell,
electrode layers with alignment layers on the insides of the outer plates, a tilt angle between the longitudinal axis of the molecules at the surface of the outer plates and the outer plates of from 0 degree to 30 degrees, and a twist angle of the liquid-crystal mixture in the cell from alignment layer to alignment layer with a value of 22.5°–600°, a nematic liquid-crystal mixture comprising a) 15–75% by weight of a liquid-crystalline component A consisting of one or more compounds having a dielectric anisotropy of greater than +1.5;

b) 25–85% by weight of a liquid-crystalline component B consisting of one or more compounds having a dielectric anisotropy of between −1.5 and +1.5;

c) 0–20% by weight of a liquid-crystalline component D consisting of one or more compounds having a dielectric anisotropy of below −1.5, and d) if desired, an optically active component C in such an amount that the ratio between the layer thickness (separation of the outer plates) and the natural pitch of the chiral nematic liquid-crystal mixture is from about 0.2 to 1.3, characterised in that the nematic liquid-crystal mixture comprises at least one compound of formula I as described above and below.

The invention also relates to TN and STN displays, in particular medium- and low-multiplexed STN displays, containing the liquid-crystal mixture according to the invention.

The compounds of formula I can be used as components of liquid crystal mixtures for liquid crystal display devices, for example conventional LCDs of the DAP (deformation of aligned phases) or VA (vertically aligned) mode, like e.g. ECB (electrically controlled birefringence), CSH (colour super homeotropic), VA or VAC (vertically aligned cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic), in AMD-TN (active matrix driven TN) displays, in displays of the IPS (in plane switching) mode which are also known as 'super TFT' displays, or in displays using liquid crystals in the isotropic state, hereinafter shortly referred to as "isotropic mode display", as described, for example, in DE 102 172 73 and WO 02/93244 A1, furthermore in phase-change, guest-host, ferroelectric, flexoelectric or cholesteric displays like SSCT (surface stabilized cholesteric texture), PSCT (polymer stabilized cholesteric texture) or displays based on "blue phases".

Furthermore, the compounds and liquid crystal mixtures according to the present invention can be used in bistable nematic displays, like e.g. displays with controlled alignment or surface anchoring of the liquid crystal material by surface gratings, microscopic postst or other means, as described, for example, in H. Yokoyama et al., Nature 2002, 420, p. 159; G. P. Bryan-Brown et al., SID Digest Volume XXVIII, 1997, p.37; S. Kitson and A. Geisow, Appl. Phys. Lett. 2002, 80(19), p.3635 or in US 2001/0012080 A1.

Especially preferred are TN and STN displays.

The compounds of formula I can be used to modify a number of physical properties in a liquid crystalline mixture, such as the birefringence, rotational viscosity and elastic constants, leading to improvements in optical performance of the display device. In particular, the presence of a C=C double bond in the terminal group $R^a$ or $R^b$ reduces smectic phase behaviour. Lateral substitution by L can also give rise to smectic phase suppression and also lower melting points.

Especially preferred are compounds of formula I wherein r is 0, 1 or 2.

Further preferred are compounds of formula I wherein r is 2 and the phenyl ring is substituted by L in 2- and 3-position or in 3- and 5-position or in 2- and 6-position.

Further preferred are compounds of formula I wherein $R^b$ is alkenyl with 2 to 9 carbon atoms.

L in formula I is preferably F, Cl, CN, $CF_3$, $OCF_3$ or $OCH_3$, very preferably F.

Further preferred are compounds of formula I selected from the following formulae Ia to Ie

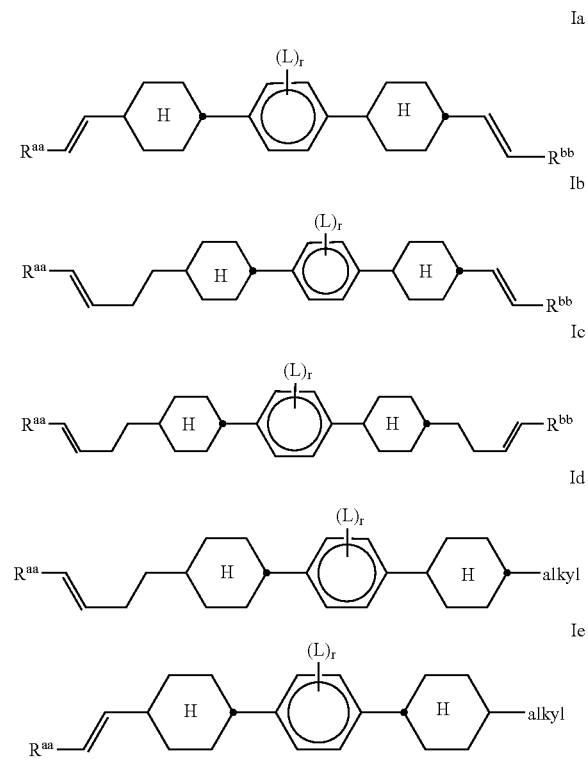

wherein $R^{aa}$ and $R^{bb}$ are independently of each other H, $CH_3$, $C_2H_5$ or $n-C_3H_7$ and alkyl is an alkyl group with 1 to 8 carbon atoms.

Especially preferred are compounds of formula Ia and Ic, in particular wherein $R^{aa}$ and $R^{bb}$ are H or $CH_3$, and compounds of formula Ie, in particular wherein $R^{aa}$ is H or $CH_3$.

Furthermore preferred are compounds of formula I and Ia to Ie, wherein

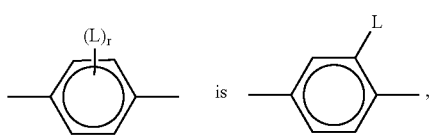

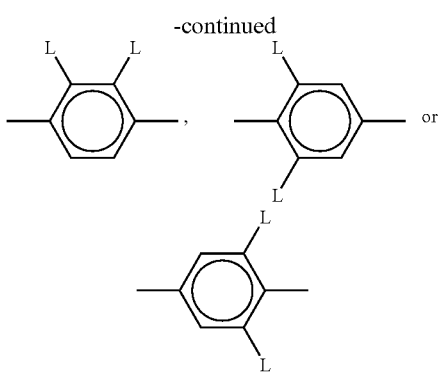

and L is as defined above and is very preferably F.

If $R^b$ in formula I is an alkyl or alkoxy radical, i.e. where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

If $R^a$ or $R^b$ is an alkyl group wherein one or more $CH_2$ groups are replaced by —CH=CH—, this may be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

If $R^b$ is an alkyl group, wherein one $CH_2$ group is replaced by —O— and one by —CO—, these radicals are preferably neighboured. Accordingly these radicals together form a carbonyloxy group —CO—O— or an oxycarbonyl group —O—CO—. Preferably, this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxy-carbonylmethyl, butoxycarbonylmethyl, 2-(methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl, or 4-(methoxycarbonyl)-butyl.

If $R^b$ is an alkyl group, wherein two or more $CH_2$ groups are replaced by —O— and/or —COO—, it can be straight-chain or branched. It is preferably straight-chain and has 3 to 12 C atoms. Accordingly, it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, or 5,5-bis-(ethoxycarbonyl)-hexyl.

If $R^b$ is an alkyl or alkenyl group that is monosubstituted by CN or $CF_3$, it is preferably straight-chain. The substitution by CN or $CF_3$ can be in any desired position.

If $R^b$ is an alkyl or alkenyl group that is at least monosubstituted by halogen, it is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluormethyl, 2-fluorethyl, 3-fluorpropyl, 4-fluorbutyl, 5-fluorpentyl, 6-fluorhexyl and 7-fluorheptyl. Other positions of F are, however, not excluded.

Halogen means F, Cl, Br and I and is preferably F or Cl.

The compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific and preferred methods are described in the reaction schemes below. Further methods can be taken from the examples.

Scheme 1:

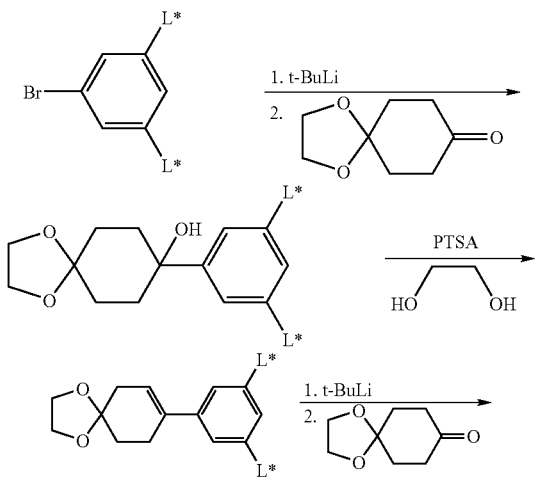

-continued

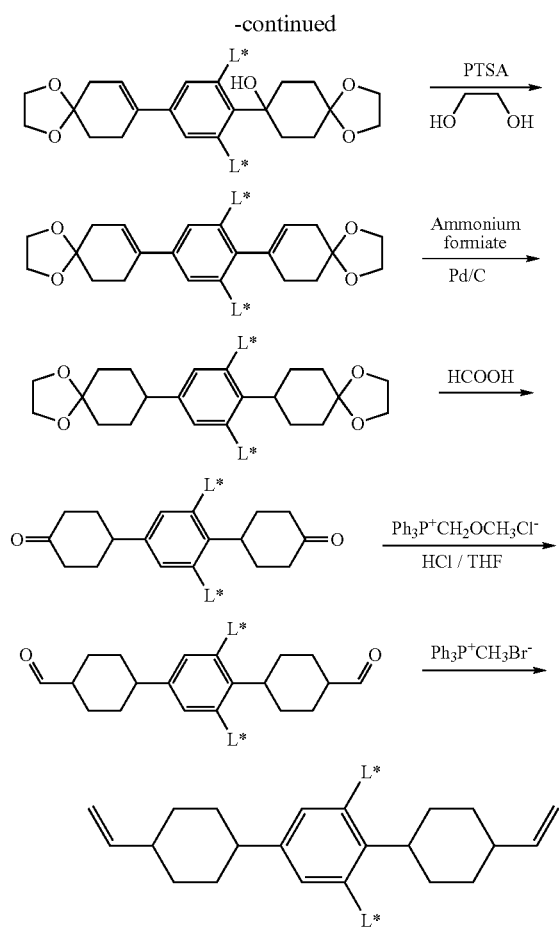

wherein L* is H or F.

Scheme 2:

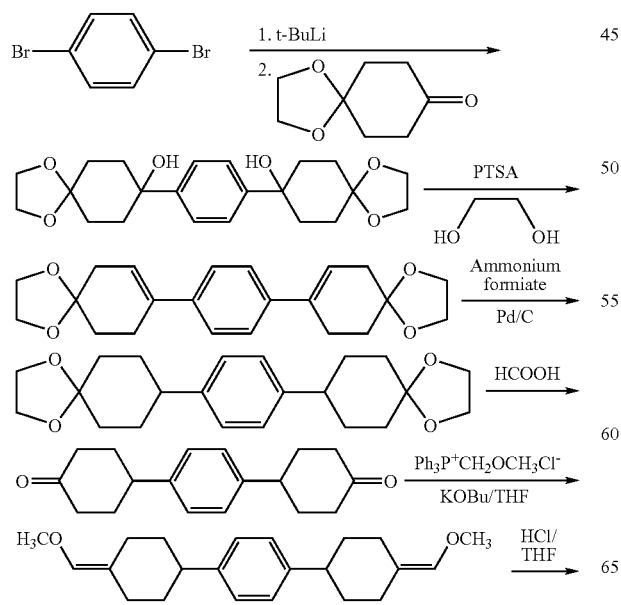

-continued

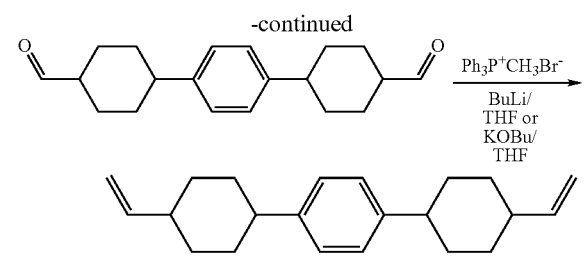

Another object of the invention is a liquid crystalline mixture comprising one or more compounds of formula I. The use of compounds of the formula I in the liquid-crystal mixtures according to the invention results in reduced smectic phase behaviour and low melting points and in TN and STN displays having high steepness and fast response times, in particular at low temperatures.

Besides the compounds of the formula I, the liquid-crystalline mixture according to the invention additionally preferably comprises one or more alkenyl compounds of formula II

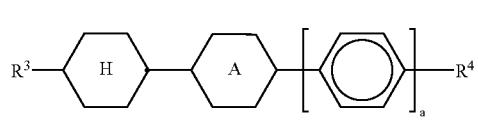

in which

A is 1,4-phenylene or trans-1,4-cyclohexylene, a is 0 or 1, $R^3$ is an alkenyl group having from 2 to 9 carbon atoms, and $R^4$ is as defined for $R^b$.

Particularly preferred compounds of the formula II are those selected of the following formulae:

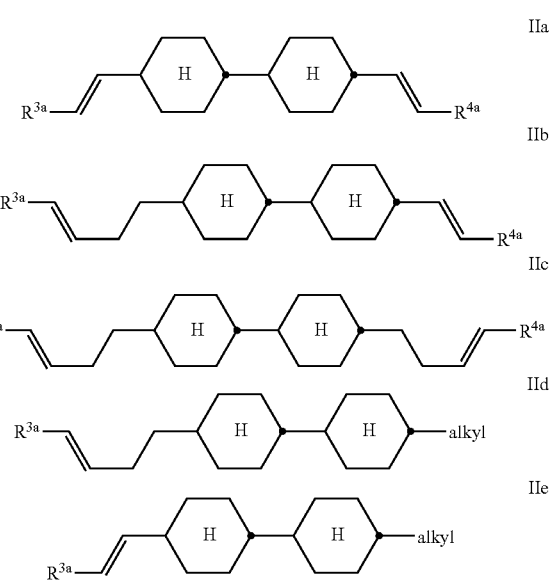

-continued

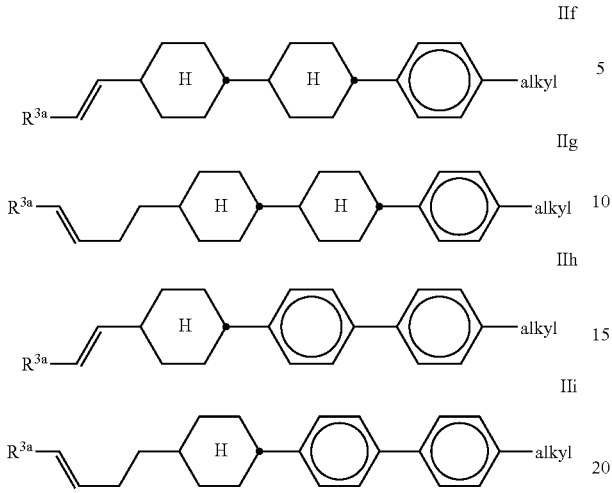

wherein $R^{3a}$ and $R^{4a}$ are independently of each other H, $CH_3$, $C_2H_5$ or n-$C_3H_7$ and alkyl is an alkyl group with 1 to 8 carbon atoms.

Especially preferred are compounds of formula IIa, in particular wherein $R^{3a}$ and $R^{4a}$ are H or $CH_3$, and compounds of formula IIe, IIf, IIg, IIh and IIi, in particular wherein $R^{3a}$ is H or $CH_3$.

The compounds of formula I and II with a dielectric anisotropy from −1.5 to +1.5 ("dielectrically neutral") are part of component B as defined above. Similarly, compounds of formula I and II with a dielectric anisotropy of greater than +1.5 can form a part of component A. Alternatively, component A or component B can be made up of compounds which are not in accordance with formulas I and II.

Besides the compounds of the formula I and II, the liquid-crystalline mixture according to the invention additionally preferably comprises one or more compounds of formula II* with positive dielectric anisotropy

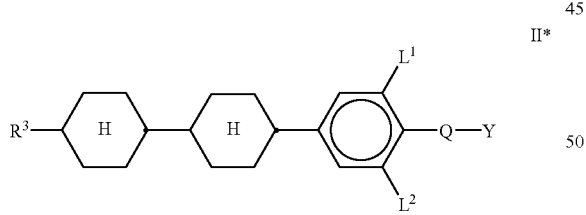

wherein $R^3$ is an alkenyl group with 2 to 7 carbon atoms,

Q is $CF_2$, $OCF_2$, CFH, OCFH or a single bond,

Y is F or Cl, and $L^1$ and $L^2$ are independently of each other H or F.

Especially preferred are compounds of formula II* wherein $L^1$ and/or $L^2$ are F and Q-Y is F or $OCF_3$.

Further preferred are compounds of formula II* wherein $R^3$ is 1E-alkenyl or 3E-alkenyl having 2 to 7, preferably 2, 3 or 4 carbon atoms.

Very preferred are compounds of formula II*a

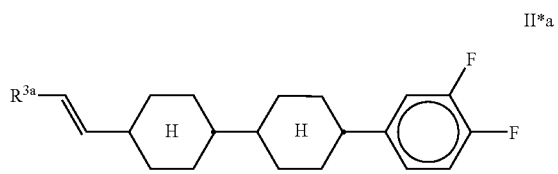

wherein $R^{3a}$ is H, $CH_3$, $C_2H_5$ or n-$C_3H_7$, in particular H or $CH_3$.

The polar compounds of formula II* with a dielectric anisotropy of more than +1.5 are part of component A as defined above.

The use of the compounds of the formulae I, II and II* in the mixtures for TN and STN displays according to the invention results in high steepness of the electro-optical characteristic line,
low temperature dependence of the threshold voltage,
very fast response times, in particular at low temperatures.

The compounds of the formulae I, II and II* significantly shorten, in particular, the response times of TN and STN mixtures while simultaneously increasing the steepness and reducing the temperature dependence of the threshold voltage.

The mixtures according to the invention are furthermore distinguished by the following advantages:

they have low viscosity,
they have a low threshold voltage and operating voltage, and
they effect long shelf lives in the display at low temperatures.

Component A preferably comprises one or more cyano compounds selected of the following formulae

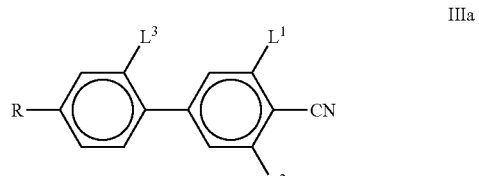

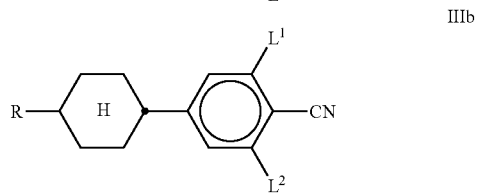

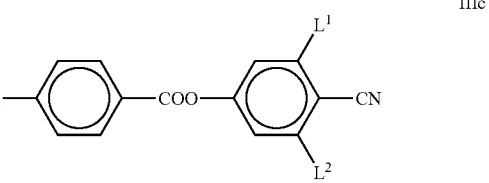

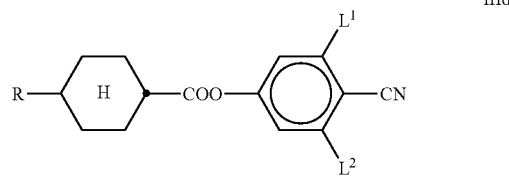

-continued

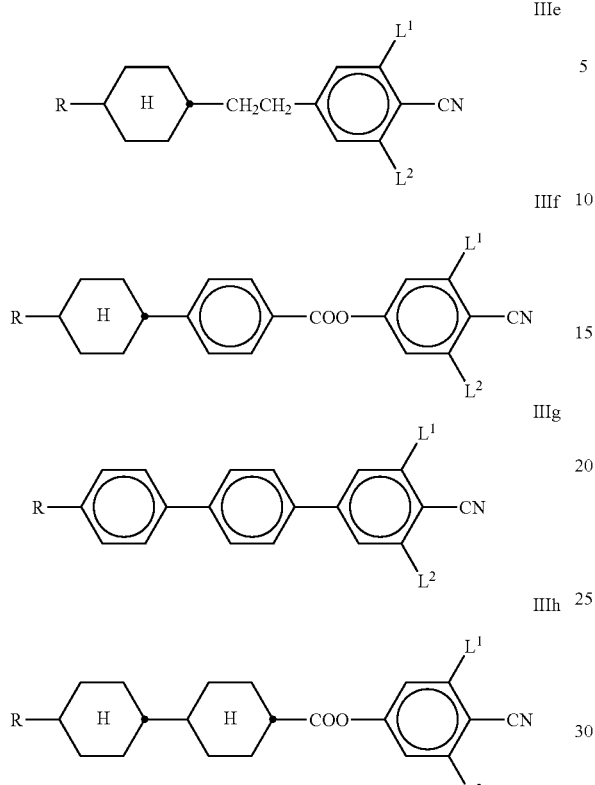

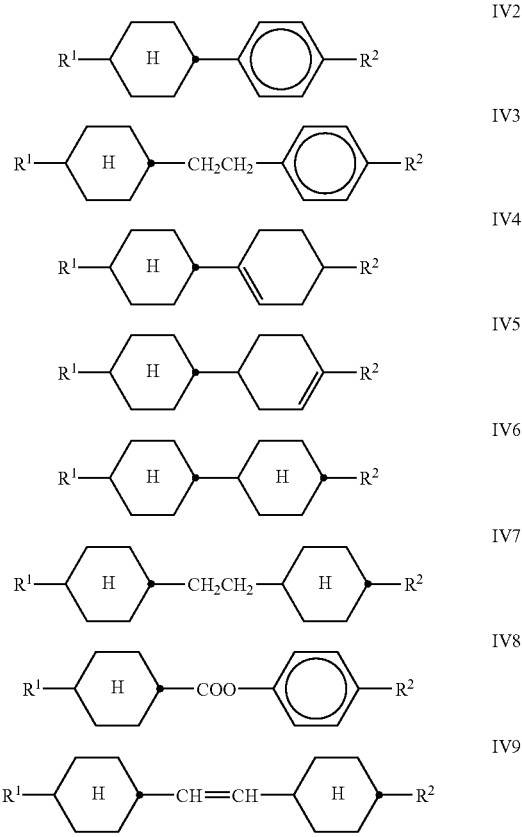

wherein
R is an alkyl, alkoxy or alkenyl group having from 1 to 12 carbon atoms, wherein one or more $CH_2$ groups in these groups may also each, independently of one another, be replaced by —O—, —CH=CH—, —CO—, —OCO— or —COO— in such a way that O atoms are not linked directly to one another, and
$L^1$, $L^2$ and $L^3$ are independently of each other H or F.

R in these compounds is especially preferably alkyl or alkoxy with 1 to 8 carbon atoms or alkenyl with 2 to 7 carbon atoms.

Very preferred are mixtures comprising one or more compounds of formula IIIb and/or IIIc, furthermore IIIf, in particular wherein $L^1$ and/or $L^2$ are F.

Preferred liquid-crystal mixtures comprise component A, preferably in a proportion of from 15% to 75%, particularly preferably from 20% to 65%. Compounds of component A preferably have a dielectric anisotropy of $\Delta\epsilon \geq +3$, in particular of $\Delta\epsilon \geq +8$, particularly preferably of $\Delta\epsilon \geq +12$.

Preferred liquid-crystal mixtures comprise component B, preferably in an amount of from 25 to 85%. The compounds from group B are distinguished, in particular, by their low values for the rotational viscosity $\gamma_1$.

Component B preferably furthermore comprises one or more compounds selected from the group consisting of the bicyclic compounds of the following formulae

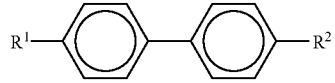

and/or one or more compounds selected from the group consisting of the tricyclic compounds of the following formulae

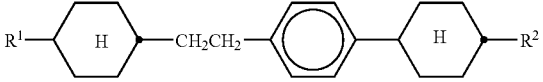

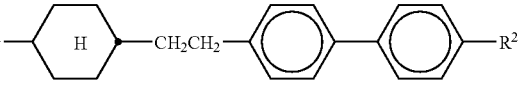

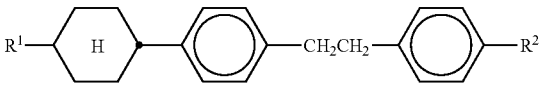

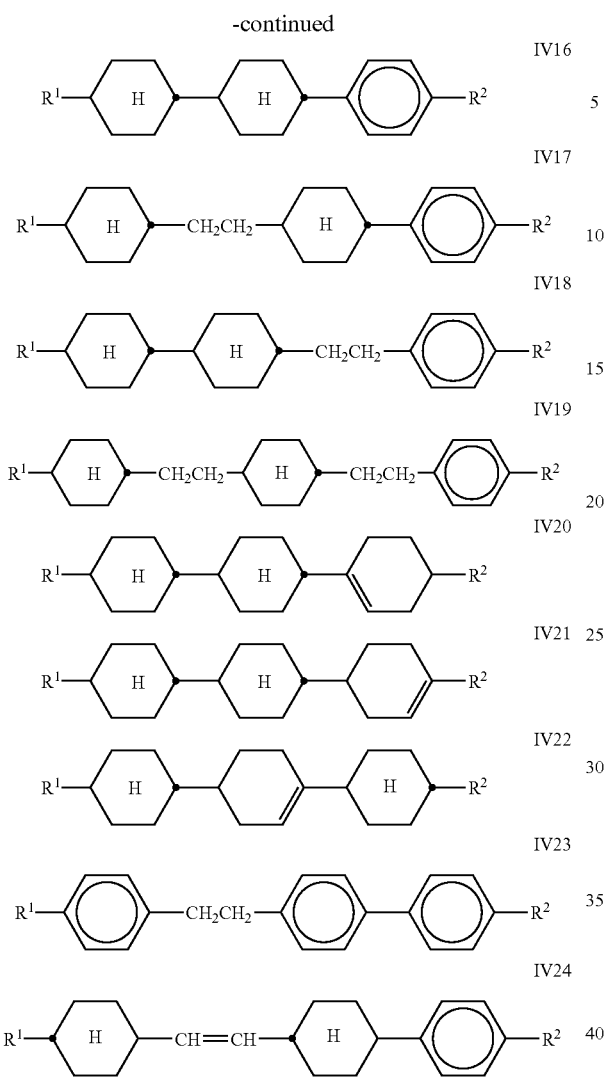

and/or one or more compounds selected from the group consisting of the tetracyclic compounds of the following formulae wherein
$R^1$ and $R^2$ are independently of each other an alkyl, alkoxy or alkenyl group having from 1 to 12 carbon atoms, wherein one or more $CH_2$ groups in these groups may also each, independently of one another, be replaced by —O—, —CH=CH—, —CO—, —OCO— or —COO— in such a way that O atoms are not linked directly to one another, and L is H or F, and wherein the 1,4-phenylene groups in formulae IV10 to IV19 and formulae IV23 to IV33 are optionally mono- or polysubstituted by F.

Particular preference is given to compounds of the formulae IV27 to IV33 in which $R^1$ is alkyl and $R^2$ is alkyl or alkoxy, in particular alkoxy, each having from 1 to 7 carbon atoms. Preference is furthermore given to compounds of the formulae IV27 and IV33 in which L is F.

Especially preferred are compounds of formula IV27 and IV29.

$R^1$ and $R^2$ in the compounds of the formulae IV1 to IV33 are particularly preferably straight-chain alkyl or alkoxy having from 1 to 12 carbon atoms.

Particular preference is given to mixtures according to the invention which comprise one or more compounds of the formulae IV24a and/or IV24b IV24b
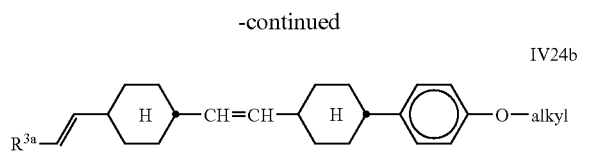

wherein $R^{3a}$ is as defined above.

The mixtures preferably comprise 2 to 25% by weight, in particular 2 to 15% by weight, of compounds of the formulae IV24a and/or IV24b.

In a further preferred embodiment the liquid-crystal mixture comprises one or more tolane compounds selcted from the group comprising formulae Ta to Ti Ta
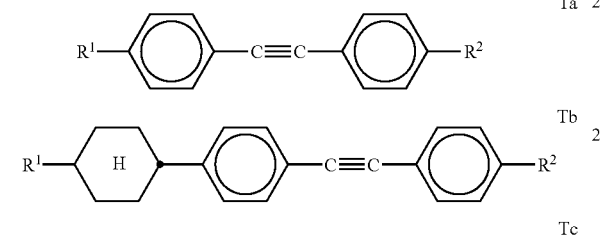

Tb

Tc
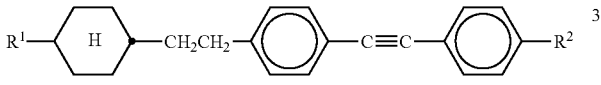

Td

Te
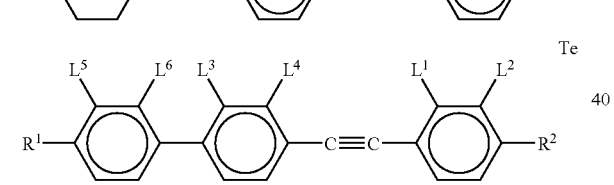

Tf
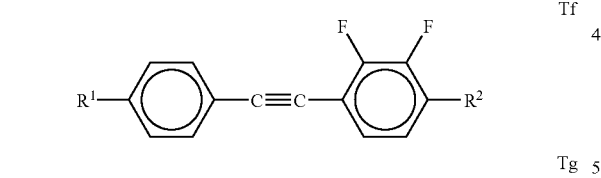

Tg
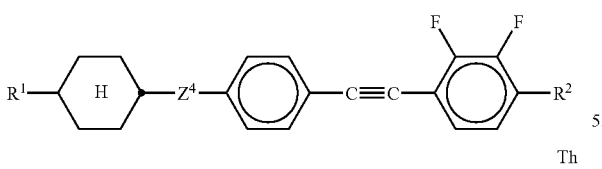

Th
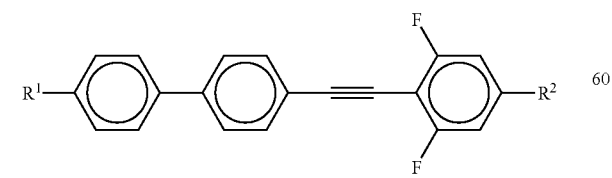

Ti
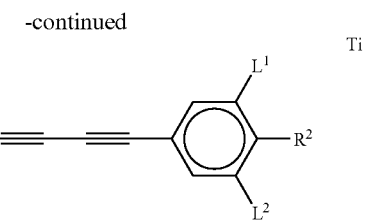

wherein $R^1$ and $R^2$ are as defined in formula IV above,
$Z^4$ is —CO—O—, —CH$_2$CH$_2$— or a single bond, and
$L^1$ to $L^6$ are independently of each other H or F.

Especially preferred are compounds of formula Ta, Tb and Th.

The proportion of the compounds from the group consisting of formulae Ta and Tb is preferably from 2 to 30%, very preferably from 3 to 20%. The proportion of the compounds of formula Th is preferably from 2 to 35%, very preferably from 4 to 25%.

The proportion of the compounds from the group consisting of Ta to Ti is preferably from 2 to 55%, very preferably from 5 to 35%.

In a further preferred embodiment, component A or the liquid-crystalline mixture according to the invention additionally preferably comprises one or more 3,4,5-trifluorophenyl compounds selected from the following formulae Va
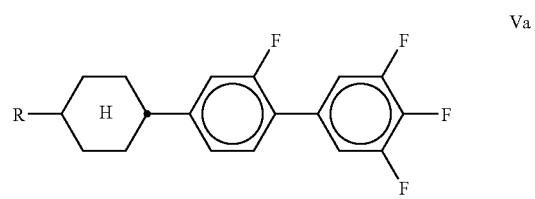

Vb
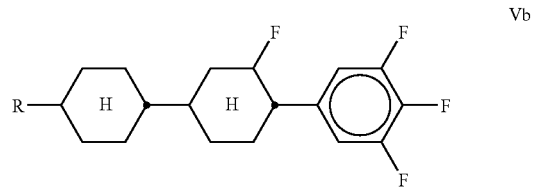

Vc
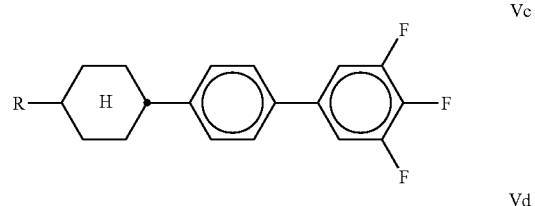

Vd
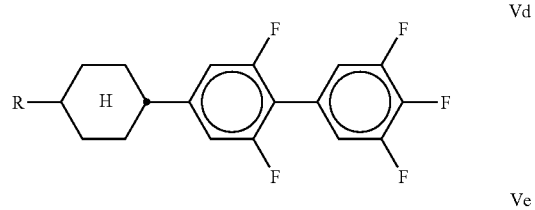

Ve
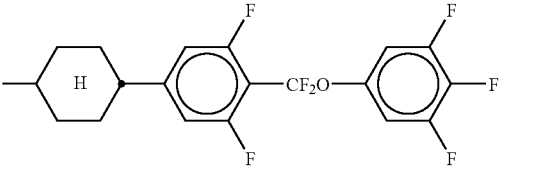

-continued and/or one or more compounds with a polar terminal group selected from the following formulae -continued

[Structures VIc, VId, VIe, VIf, VIg, VIh, VIi, VIk, VIm shown in left column]

-continued

[Structures VIn, VIo, VIp, VIq, VIr, VIs shown in right column]

wherein R is as defined in formula III and $L^3$ and $L^4$ are independently of each other H or F. Preferably, R in these compounds is alkyl or alkoxy with 1 to 8 carbon atoms.

Especially preferred are compounds of formula Va, Vb, Vc, Vd, Vm and VIi, in particular compounds of formulae Vn, Va, Vm and VIi.

In a further preferred embodiment the liquid-crystal mixture comprises one or more, particularly preferably one, two or three, heterocyclic compounds of the formula VIIa and/or VIIb

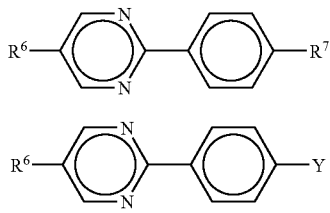

in which $R^6$ and $R^7$ are as defined above, and Y is F or Cl.

The proportion of the compounds from the group consisting of VIIa and VIIb is preferably from 2 to 35%, in particular from 5 to 20%.

If desired, the liquid-crystalline mixtures comprise an optically active component C in such an amount that the ratio between the layer thickness (separation of the outer plates) and the natural pitch of the chiral nematic liquid-crystal mixture is greater than 0.2. A multiplicity of chiral dopants, some of which are commercially available, is available to the person skilled in the art for the component, such as, for example, cholesteryl nonanoate, S-811, S-1011, S-2011 and CB15 from Merck KGaA, Darmstadt. The choice of dopants is not crucial per se.

The proportion of the compounds of component C is preferably from 0 to 10%, in particular from 0 to 5%, particularly preferably from 0 to 3%.

The mixtures according to the invention may also, if desired, comprise up to 20% of one or more compounds having a dielectric anisotropy of less than −2 (component D).

If the mixtures comprise compounds of component D, these are preferably one or more compounds containing the structural unit 2,3-difluoro-1,4-phenylene, for example compounds as described in DE-A 38 07 801, 38 07 861, 38 07 863, 38 07 864 or 38 07 908. Particular preference is given to tolans containing this structural unit, as described in International Patent Application WO 88/07514.

Further known compounds of component D are, for example, derivatives of the 2,3-dicyanohydroquinones or cyclohexane derivatives containing the structural unit

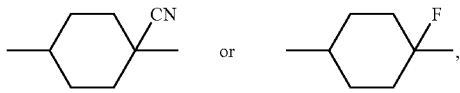

as described in DE-A 32 31 707 and DE-A 34 07 013.

The liquid-crystal displays according to the invention preferably contain no compounds of component D.

The term "alkenyl" in the definition of R and $R^1$ to $R^7$ covers straight-chain and branched alkenyl groups, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

In particularly preferred embodiments, the liquid-crystalline mixture comprises
- one or more compounds of formula I wherein the phenyl ring is substituted by L in 2- and 3-position or in 3- and 5-position or in 2- and 6-position, and/or wherein $R^b$ is alkenyl with 2 to 9 carbon atoms,
- one or more compounds of formula I wherein L is F, Cl, CN, $CF_3$, $OCF_3$ or $OCH_3$, very preferably F,
- one or more compounds selected of formulae Ia to Ie,
- one or more compounds selected of formulae IIa to IIi,
- one or more compounds of formula II*a,
- one or more compounds selected of formulae IIIb, IIIc and IIIf,
- one or more compounds selected of formulae Ta, Tb and Th,
- one or more compounds selected of formulae IV24a and IV24b,
- 5 to 30%, preferably 6 to 20% of compounds of formula I,
- 10 to 50%, preferably 10 to 40% of compounds of formula II and II*,
- 7 to 45%, preferably 10 to 30% of compounds of formula Ta, Tb and Th,
- 2 to 25%, preferably 3 to 20% of compounds of formula IV24a and IV24b,
- 8 to 40%, preferably 10 to 30% of compounds of formulae IIIa to IIIh.

The individual compounds of the formulae II to VII, II*, Ta—Ti and their sub-formulae or also other compounds which can be used in the mixtures or TN and STN displays according to the invention are either known or can be prepared analoguously to the known compounds.

The mixtures according to the invention are distinguished, in particular on use in TN and STN displays of high layer thicknesses, by very low total response times ($t_{tot}=t_{on}+t_{off}$).

The liquid-crystal mixtures used in the TN and STN cells according to the invention are dielectrically positive, with $\Delta\epsilon \geq 1$. Particular preference is given to liquid-crystal mixtures with $\Delta\epsilon \geq 3$, in particular with $\Delta\epsilon \geq 5$.

The liquid-crystal mixtures according to the invention have favourable values for the threshold voltage $V_{10/0/20}$ and for the rotational viscosity $\gamma_1$. If the value for the optical path difference d·Δn is pre-specified, the value for the layer thickness d is determined by the optical anisotropy Δn. In particular at relatively high values for d·Δn, the use of liquid-crystal mixtures according to the invention having a relatively high value for the optical anisotropy is generally preferred, since the value for d can then be selected to be relatively small, which results in more favourable values for the response times. However, liquid-crystal displays according to the invention which contain liquid-crystal mixtures according to the invention with smaller values for Δn are also characterised by advantageous values for the response times.

The liquid-crystal mixtures according to the invention are furthermore characterised by advantageous values for the steepness of the electro-optical characteristic line, and can be operated with high multiplex rates, in particular at temperatures above 20° C. In addition, the liquid-crystal mixtures according to the invention have high stability and favourable values for the electrical resistance and the frequency dependence of the threshold voltage. The liquid-crystal displays according to the invention have a large working-temperature range and good angle dependence of the contrast.

The construction of the liquid-crystal display elements according to the invention from polarisers, electrode base plates and electrodes having a surface treatment such that the preferential alignment (director) of the liquid-crystal molecules in each case adjacent thereto is usually twisted by a value of from 160° to 720° from one electrode to the other corresponds to the usual structure for display elements of this type. The term "usual structure" here is broadly drawn and also covers all derivatives and modifications of the TN and STN cell, in particular also matrix display elements and display elements containing additional magnets.

The surface tilt angle at the two outer plates may be identical or different. Identical tilt angles are preferred. Preferred TN displays have pre-tilt angles between the longitudinal axis of the molecules at the surface of the outer plates and the outer plates of from 0° to 7°, preferably from 0.01° to 5°, in particular from 0.1 to 2°. In the STN displays, the pre-tilt angle is from 1° to 30°, preferably from 1° to 12° and in particular from 3° to 10°.

The twist angle of the TN mixture in the cell has a value of between 22.5° and 170°, preferably between 45° and 130° and in particular between 80° and 115°. The twist angle of the STN mixture in the cell from alignment layer to alignment layer has a value of between 100° and 600°, preferably between 170° and 300° and in particular between 180° and 270°.

The liquid crystal mixtures according to the present invention are also suitable as liquid crystal media for use in cholesteric liquid crystal displays, in particular in SSCT ("surface stabilized cholesteric texture") and PSCT— ("polymer stabilized cholesteric texture") displays, as described for example in WO 92/19695, U.S. Pat. No. 5,384,067, U.S. Pat. No. 5,453,863, U.S. Pat. No. 6,172,720 or U.S. Pat. No. 5,661,533. Cholesteric liquid crystal displays typically comprise a cholesteric liquid crystal medium consisting of a nematic component and an optically active component and, compared to TN- and STN displays, exhibit a significantly higher helical twist and show selective reflection of circular polarised light. The reflection wavelength is given by the product of the pitch of the cholesteric helix and the mean refractive index of the cholesteric liquid crystal medium.

For this purpose one or more chiral dopants are added to the liquid crystal mixture according to the present invention, wherein the twisting power and concentration of the dopants are selected such that the resulting liquid crystal medium has a cholesteric phase at room temperature and a reflection wavelength that lies preferably within the visible, UV or IR range of the electromagnetic spectrum, in particular within the range from 400 to 800 nm.

Suitable chiral dopants are known to the expert and commercially available, like for example cholesteryl nonanoate (CN), CB15, R/S-811, R/S-1011, R/S-2011, R/S-3011 or R/S-4011 (Merck KGaA, Darmstadt). Particularly suitable are dopants with high twisting power comprising a chiral sugar group, in particular derivatives of sorbitol, mannitol or iditol, very preferably sorbitol derivatives as disclosed in WO 98/00428. Further preferred are dopants comprising a hydrobenzoin group as described in GB 2,328, 207, chiral binaphthyl derivatives as described in WO 02/94805, chiral binaphthol acetal derivatives as described in WO 02/34739, chiral TADDOL derivatives as described in WO 02/06265, and chiral dopants with at least one fluorinated linkage group and a terminal or central chiral group as described in WO 02/06196 and WO 02/06195.

In case two or more dopants are used, they can exhibit the same or opposite twist sense and the same or opposite sign of the linear temperature coefficient of the twist.

Cholesteric liquid crystal media comprising as nematic component a liquid crystal mixture according to the present invention and as optically active component one or more chiral dopants are another object of the present invention. Yet another object of the invention are cholesteric liquid crystal displays, in particular SSCT- and PSCT-displays, comprising a cholesteric liquid crystal medium as described above.

The liquid-crystal mixtures which can be used in accordance with the invention are prepared in a manner which is conventional per se. In general, the desired amount of the components used in lesser amount are dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives which are known to the person skilled in the art and are described in the literature. For example, 0–15% of pleochroic dyes, stabilisers, antioxidants, UV absorbers, etc., may be added.

The entire disclosure of all applications, patents and publications, cited above and below, and of corresponding European Application No. 03003560.4, filed Feb. 17, 2003 is hereby incorporated by reference.

In the present application and in the examples below, the structures of the liquid-crystal compounds are indicated by means of acronyms, the trans-formation into chemical formulae taking place in accordance with Tables A and B. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is indicated. In individual cases, the acronym for the parent structure is followed, separated by a dash, by the code indicated in the table below for the substituents $R^1$, $R^2$, $L^1$, $L^2$ and $L^3$.

TABLE A ($L^1$, $L^2$, $L^3$ = H or F)

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nO.m | $OC_nH_{2n+1}$ | $C_mH_{2m+1}$ | H | H | H |
| nOm | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |

TABLE A-continued (L$^1$, L$^2$, L$^3$ = H or F)

| Code for R$^1$, R$^2$, L$^1$, L$^2$, L$^3$ | R$^1$ | R$^2$ | L$^1$ | L$^2$ | L$^3$ |
|---|---|---|---|---|---|
| nmF | C$_n$H$_{2n+1}$ | C$_m$H$_{2m+1}$ | F | H | H |
| nOCF$_3$ | C$_n$H$_{2n+1}$ | OCF$_3$ | H | H | H |
| n-Vm | C$_n$H$_{2n+1}$ | —CH=CH—C$_m$H$_{2m+1}$ | H | H | H |
| nV-Vm | C$_n$H$_{2n+1}$—CH=CH— | —CH=CH—C$_m$H$_{2m+1}$ | H | H | H |

The TN and STN displays preferably contain liquid-crystalline mixtures composed of one or more compounds from Tables A and B.

TABLE B

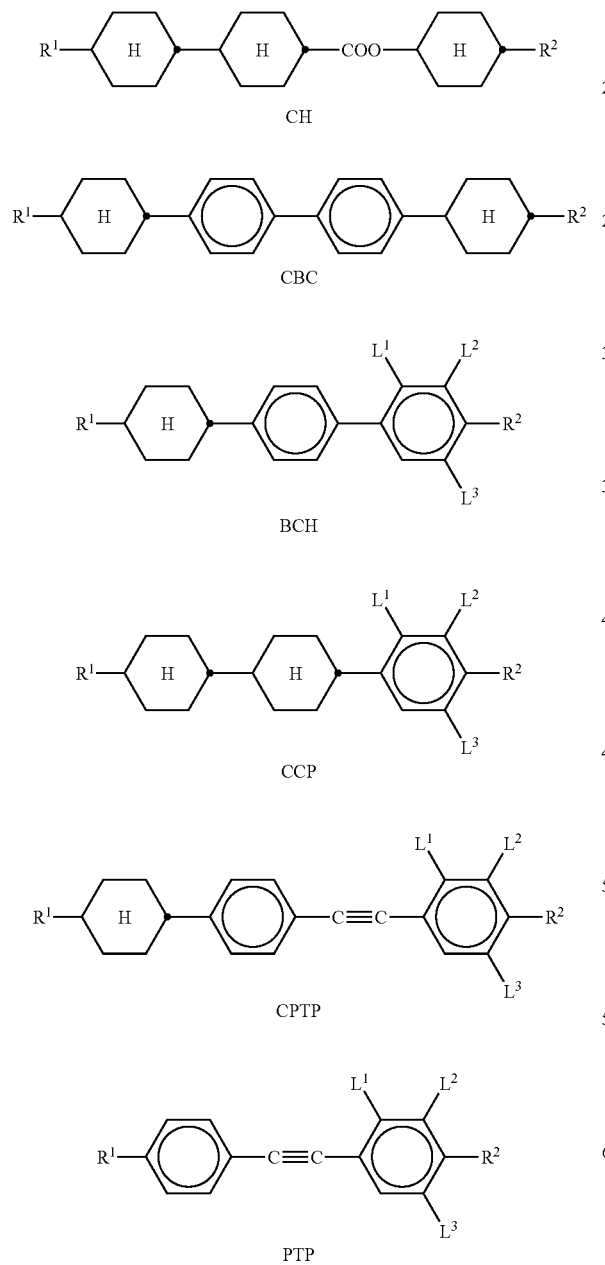

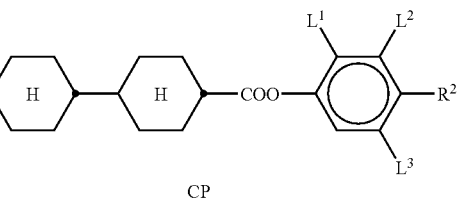

TABLE C
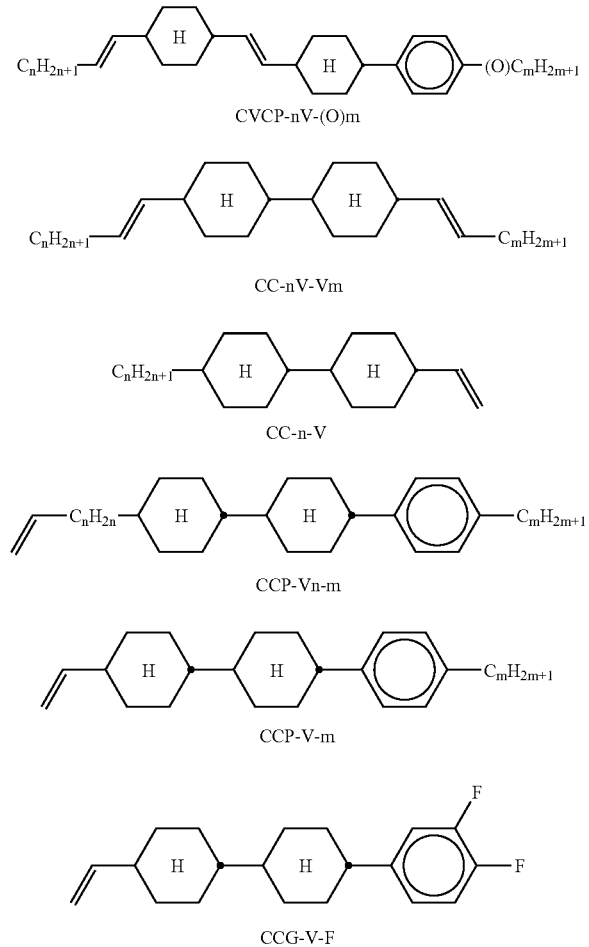
TABLE C-continued
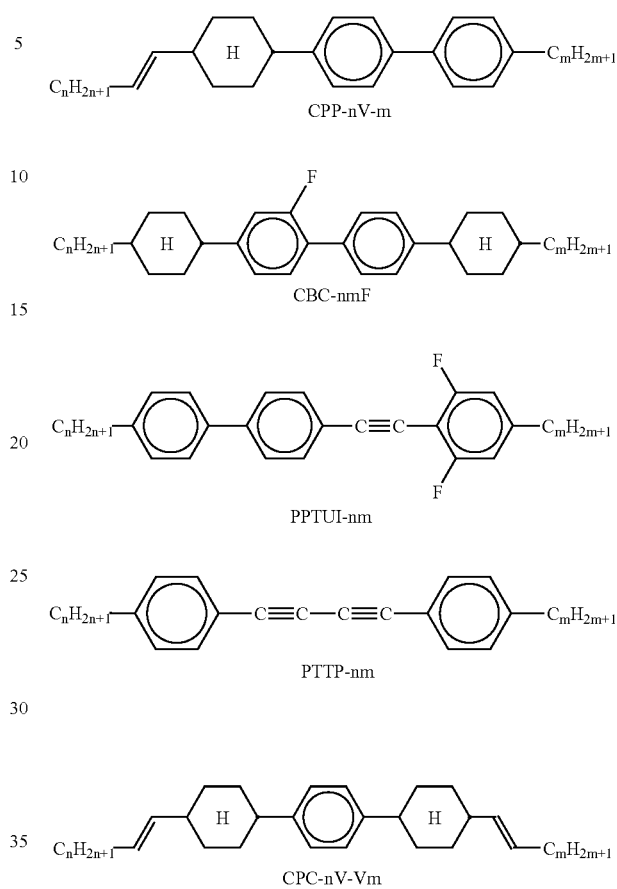
Table C shows dopants which are usually employed in the mixtures according to the invention:
TABLE D
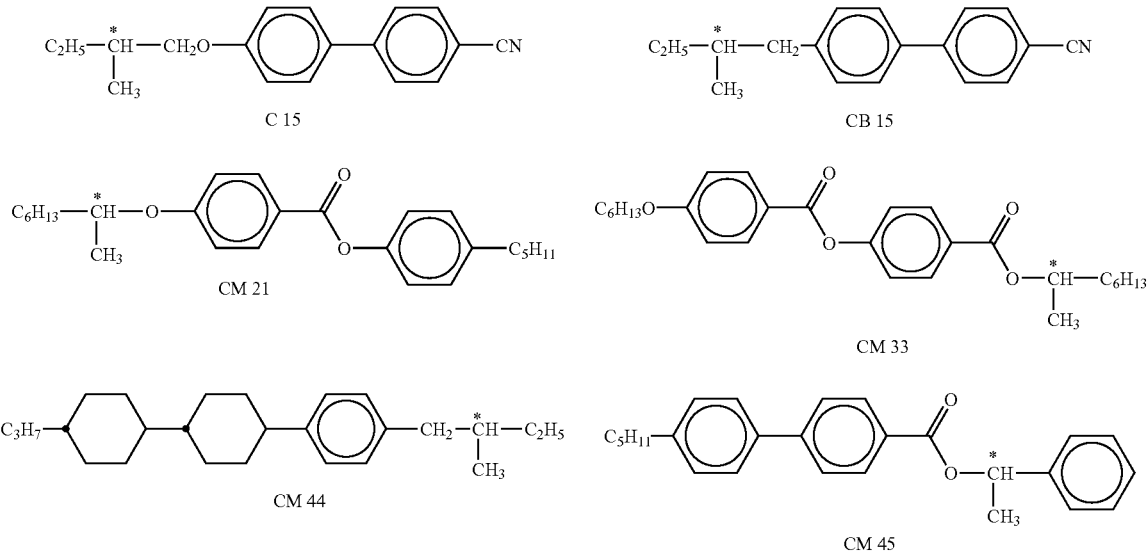

TABLE D-continued
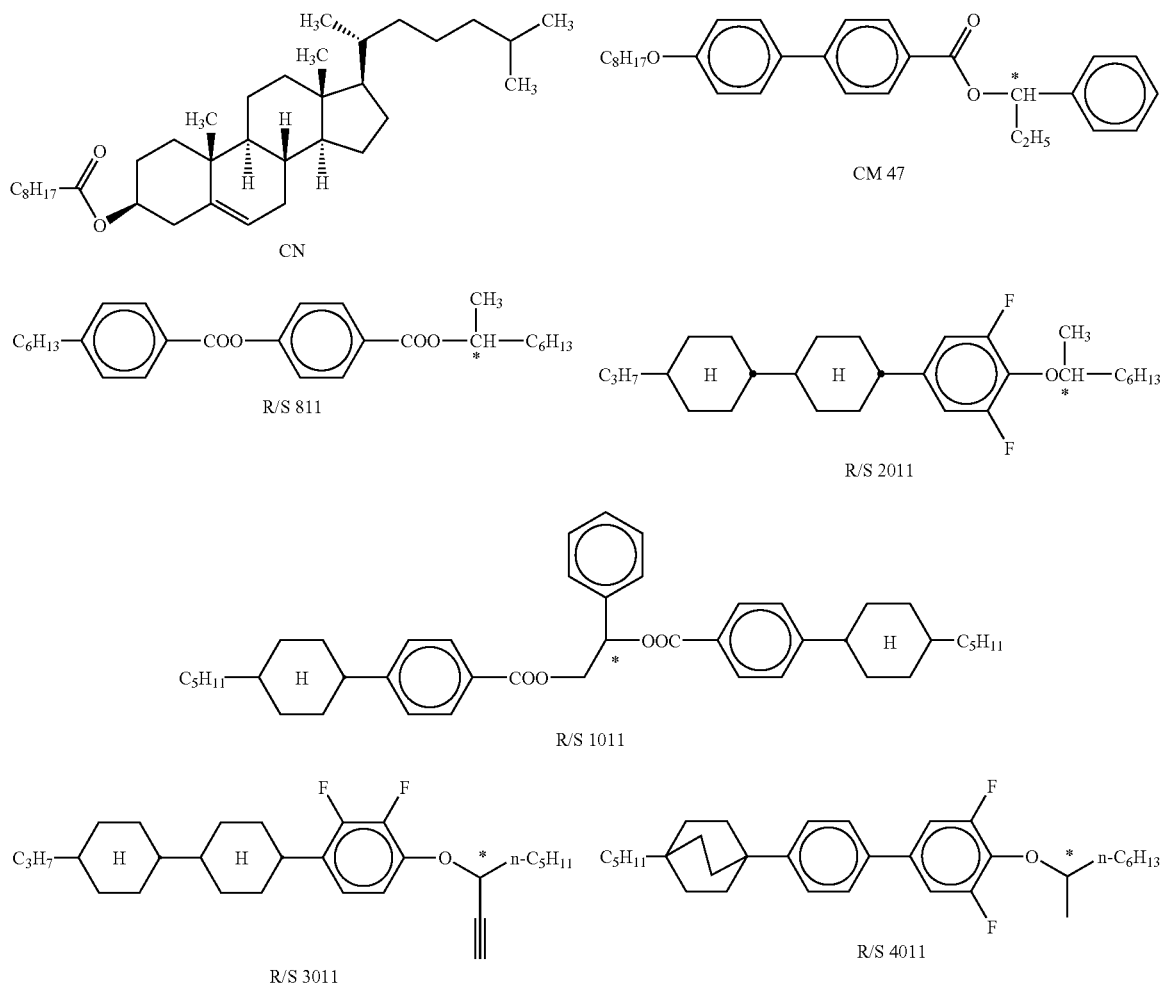
Stabilisers which can be added, for example, to the mixtures according to the invention are shown below:
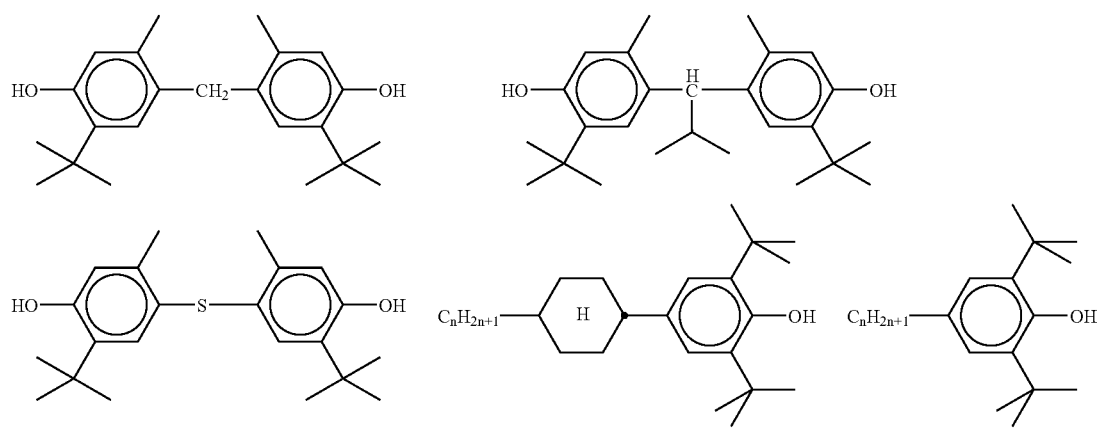

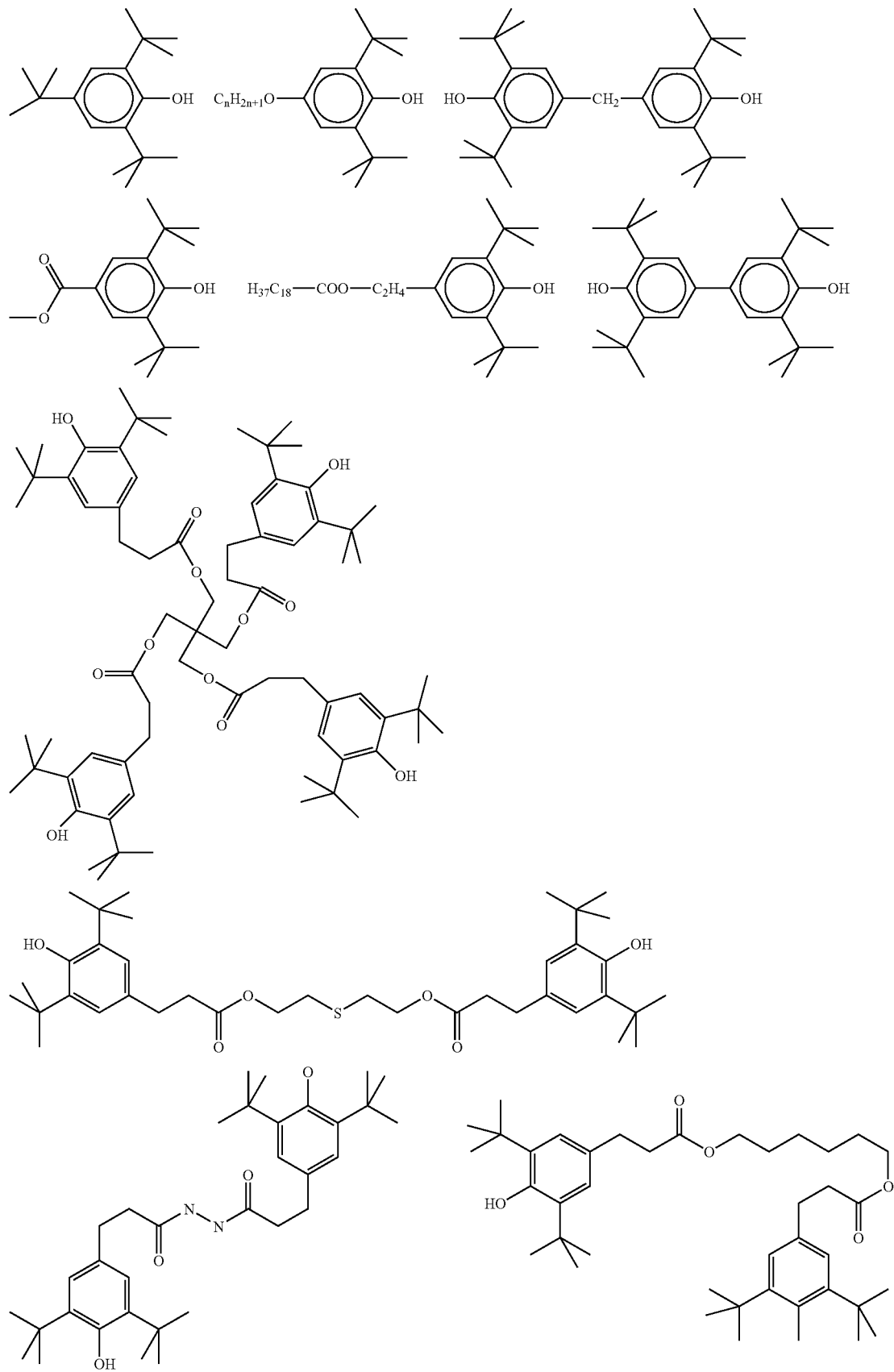

-continued
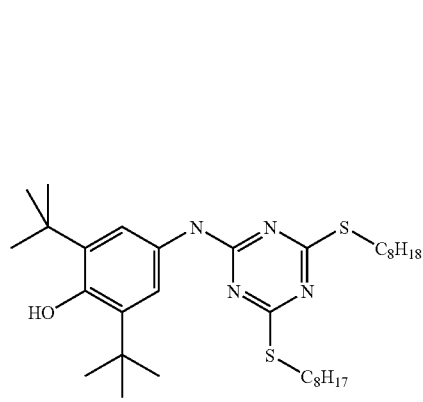
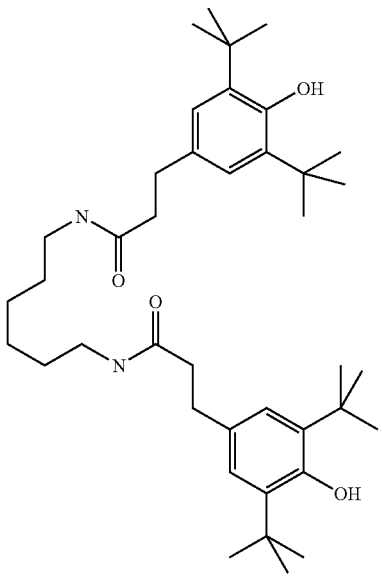
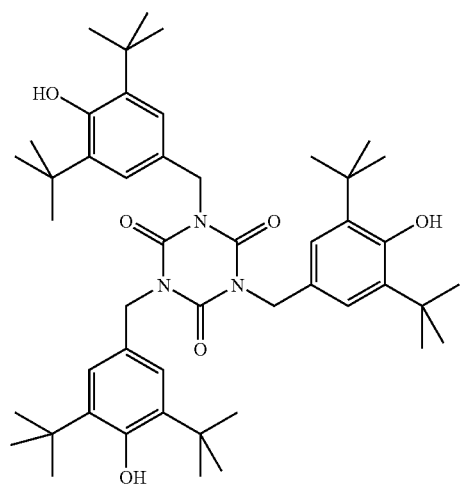
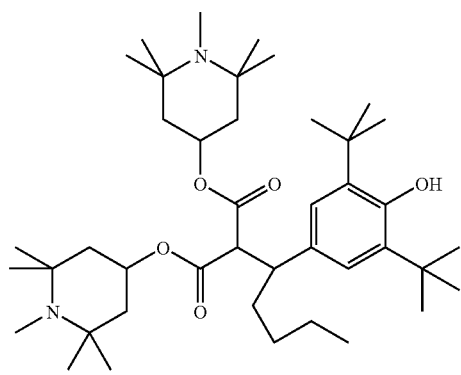
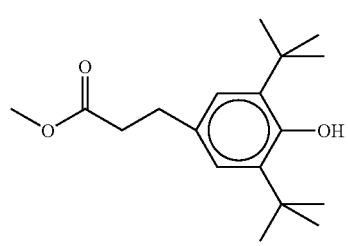
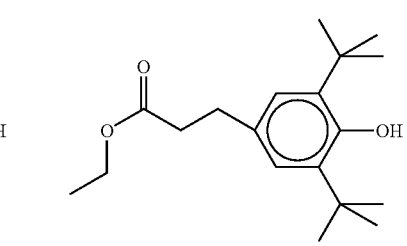
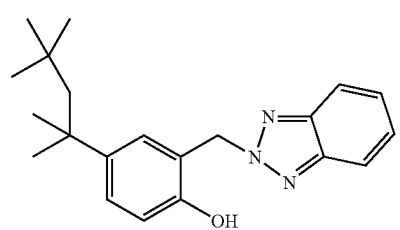
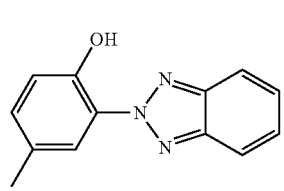
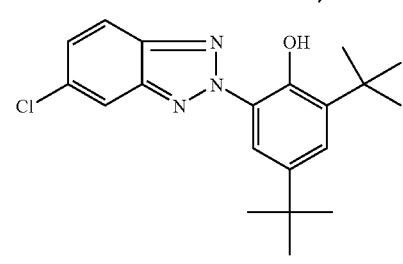
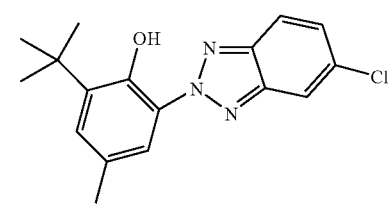

-continued
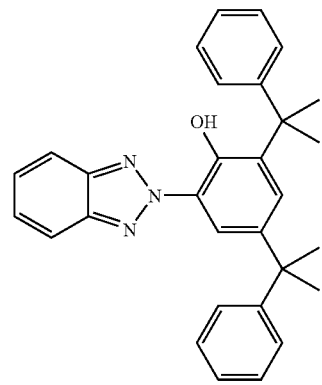
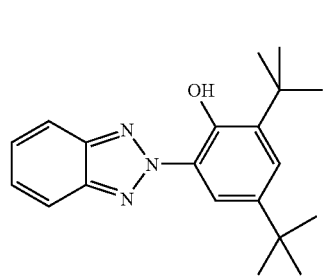
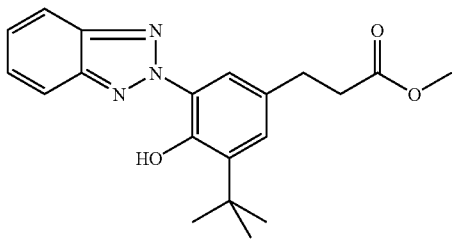
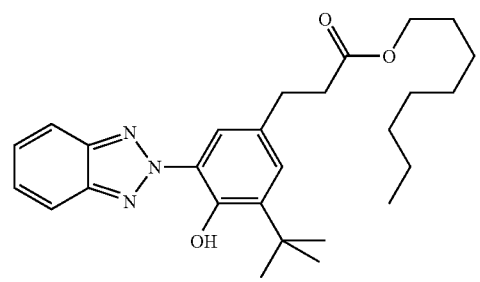
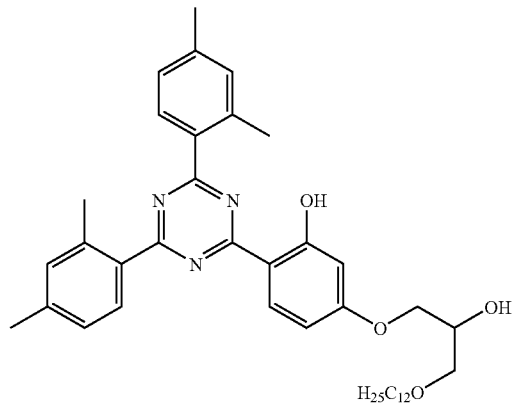
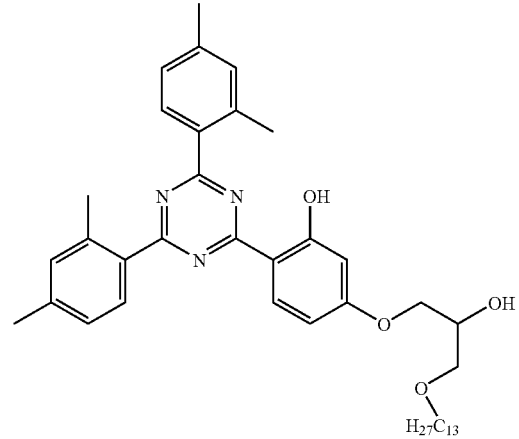
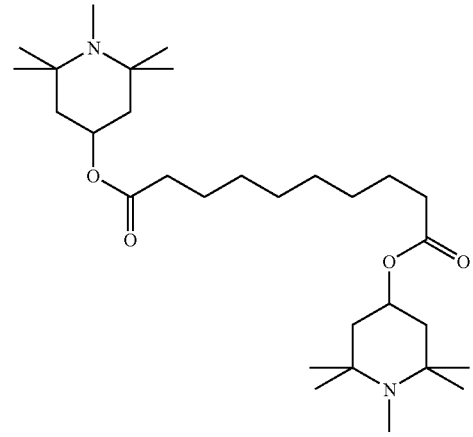

The following examples are intended to illustrate the invention without re-resenting a limitation. The following abbreviations are used:

clp. clearing point (nematic-isotropic phase transition temperature),
S—N smectic-nematic phase transition temperature,
$v_{20}$ flow viscosity (mm²/s, unless stated otherwise, at 20° C.),
$\Delta n$ optical anisotropy (589 nm, 20° C.)
$\Delta\epsilon$ dielectric anisotropy (1 kHz, 20° C.)
$\gamma_1$ rotational viscosity (mPa·s at 20° C.)
S characteristic line steepness=$(V_{90}/V_{10-1})\cdot 100$ [%]
$V_{10}$ threshold voltage=characteristic voltage at a relative contrast of 10%,
$V_{90}$ characteristic voltage at a relative contrast of 90%,
$t_{ave}$ $t_{on}+t_{off}/2$ (average response time)
$t_{sum}$ $t_{on}+t_{off}$
$t_{on}$ time from switching on until 90% of the maximum contrast is reached,
$t_{off}$ time from switching off until 10% of the maximum contrast is reached,
mux multiplex rate
$t_{store}$ low temperature storage stability in hours (−20° C., −30° C., −40° C.)

Above and below, all temperatures are given in ° C. The percentages are per cent by weight. All values relate to 20° C., unless stated otherwise. The displays, unless stated otherwise, have a twist of 240° and are addressed with a multiplex rate of 1/64 and a bias of 1/9.

EXAMPLE 1

Compound (1) was synthesized as shown in reaction scheme 2.

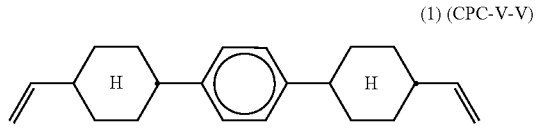

(1) (CPC-V-V)

The yield was 71.7%. The purity after HPLC was 99.9%.
K 122 N 128.6 I
$\Delta n=0.1050$
$\Delta\epsilon=1.2$
$\gamma_1=97.8$

EXAMPLE 2

Compounds (2a)–(2c) can be synthesized as shown in reaction scheme 1. The physical properties of these compounds have been simulated and are shown below.

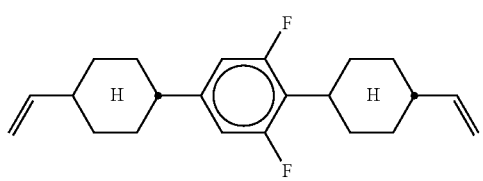

(2a)

K 85 N 100 I
$\Delta n = 0.122$, $n_e = 1.427$
$\Delta\epsilon = 1.8$, $\epsilon_\parallel = 3.867$ -continued

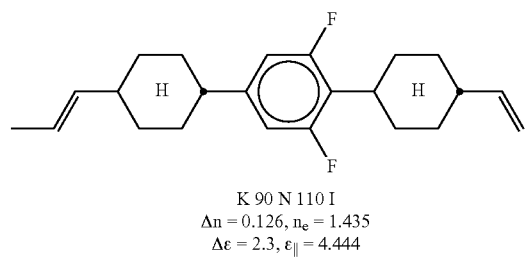

(2b)

K 90 N 110 I
$\Delta n = 0.126$, $n_e = 1.435$
$\Delta\epsilon = 2.3$, $\epsilon_\parallel = 4.444$

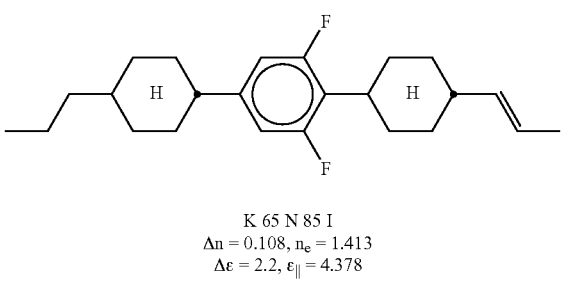

(2c)

K 65 N 85 I
$\Delta n = 0.108$, $n_e = 1.413$
$\Delta\epsilon = 2.2$, $\epsilon_\parallel = 4.378$

COMPARISON EXAMPLE 1

The following liquid crystal mixture was formulated

| | | | |
|---|---|---|---|
| PCH-3N.F.F | 10.00% | Clp.: | +88.0° C. |
| ME2N.F | 2.00% | $\Delta n$: | 0.1618 |
| ME3N.F | 2.00% | $\Delta\epsilon$: | +12.2 |
| ME4N.F | 10.00% | $V_{10}$: | 1.65 V |
| CC-5-V | 10.00% | S: | 1.068 |
| CCG-V-F | 18.00% | $t_{sum}$ [−20° C.]: | 2900 ms |
| CCP-V-1 | 8.00% | $t_{sum}$ [+20° C.]: | 220 ms |
| CCP-V2-1 | 5.00% | | |
| CVCP-V-1 | 4.00% | | |
| CVCP-V-O1 | 4.00% | | |
| CVCP-1V-O1 | 2.00% | | |
| PTP-102 | 5.00% | | |
| PTP-201 | 3.00% | | |
| PTP-301 | 3.00% | | |
| PPTUI-3-2 | 14.00% | | |

EXAMPLE 3

The following liquid crystal mixture was formulated

| | | | |
|---|---|---|---|
| CPC-V-V | 10.00% | Clp.: | +91.5° C. |
| comparison ex. 1 | 90.00% | $\Delta n$: | 0.1554 |
| | | $V_{10}$: | 1.80 V |
| | | S: | 1.048 |

The mixture has improved steepness S compared to the mixture of comparison example 1.

EXAMPLE 4

The following liquid crystal mixture was formulated

| | | | | |
|---|---|---|---|---|
| CPC-V-V | 10.00% | Clp.: | | +86.5° C. |
| PCH-3N.F.F | 10.00% | Δn: | | 0.1606 |
| ME2N.F | 3.00% | Δε: | | +13.1 |
| ME3N.F | 3.00% | $V_{10}$: | | 1.55 V |
| ME4N.F | 10.00% | S: | | 1.037 |
| CC-5-V | 7.00% | $t_{sum}$ [+20° C.]: | | 260 ms |
| CCG-V-F | 12.00% | | | |
| CCP-V-1 | 7.00% | | | |
| CCP-V2-1 | 5.00% | | | |
| CVCP-V-1 | 3.00% | | | |
| CVCP-V-O1 | 3.00% | | | |
| CVCP-1V-O1 | 3.00% | | | |
| PTP-102 | 4.00% | | | |
| PTP-201 | 4.00% | | | |
| PTP-301 | 3.00% | | | |
| PPTUI-3-2 | 13.00% | | | |

The mixture has improved steepness S and lower threshold voltage $V_{10}$ compared to the mixture of comparison example 1.

EXAMPLE 5

The following liquid crystal mixture was formulated

| | | | | |
|---|---|---|---|---|
| CPC-V-V | 10.00% | Clp.: | | +87.5° C. |
| PCH-3N.F.F | 10.00% | Δn: | | 0.1627 |
| ME2N.F | 2.00% | $V_{10}$: | | 1.72 V |
| ME3N.F | 2.00% | S: | | 1.052 |
| ME4N.F | 9.00% | $t_{sum}$ [−20° C.]: | | 2700 ms |
| CC-5-V | 9.00% | $t_{sum}$ [+20° C.]: | | 220 ms |
| CCG-V-F | 11.00% | | | |
| CCP-V-1 | 7.00% | | | |
| CCP-V2-1 | 6.00% | | | |
| CVCP-V-1 | 3.00% | | | |
| CVCP-V-O1 | 3.00% | | | |
| CVCP-1V-O1 | 2.00% | | | |
| PTP-102 | 4.00% | | | |
| PTP-201 | 4.00% | | | |
| PTP-301 | 4.00% | | | |
| PPTUI-3-2 | 14.00% | | | |

The mixture has improved steepness S and faster switching time compared to the mixture of comparison example 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium, comprising two or more liquid crystal compounds wherein at least one compound is of formula I

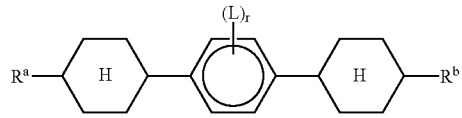

wherein $R^a$ is an alkenyl group having from 2 to 9 carbon atoms, $R^b$ is alkenyl with 2 to 9 carbon atoms, L is, in each occurrence independently, F, Cl, CN or an optionally mono- or polyhalogenated alkyl, alkoxy, alkenyl or alkenyloxy group having up to 3 carbon atoms, and r is 0, 1, 2, 3 or 4; and said mixture further comprises at least one compound of the formula

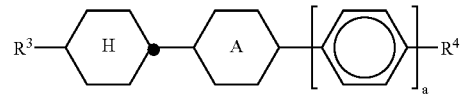

in which

A is 1,4-phenylene or trans-1,4-cyclohexylene, a is 0 or 1, $R^3$ is an alkenyl group having from 2 to 9 carbon atoms, and $R^4$ is an alkyl group having 1 to 12 carbon atoms which is unsubstituted, monosubstituted by CN or $CF_3$ or at least monosubstituted by halogen, and wherein one or more $CH_2$ groups are each, independently of one another, optionally replaced by —O—, —S—,

—CH=CH—, —C≡C—, —CO—, —CO—O—, —O—CO— or —O—CO—O— in such a way that O atoms are not linked directly to one another.

2. A liquid-crystalline medium according to claim 1, wherein said medium comprises at least one compound of formula I in which the phenyl ring is substituted by L in 2- and 3-position or in 3- and 5-position or in 2- and 6-position.

3. A liquid-crystalline medium according to claim 1, wherein said medium comprises at least one compound of formula I wherein L is F, Cl, CN, $CF_3$, $OCF_3$ or $OCH_3$.

4. A liquid-crystalline medium according to claim 1, wherein said medium further comprises at least one compound selected from the following formulae

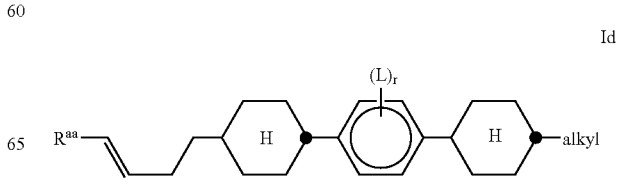

-continued

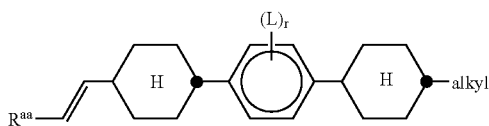

Ie wherein $R^{aa}$ is H, $CH_3$, $C_2H_5$ or n-$C_3H_7$ and alkyl is an alkyl group with 1 to 8 carbon atoms.

5. A liquid-crystalline medium according to claim 1, wherein said medium further comprises at least one compound of formula II*

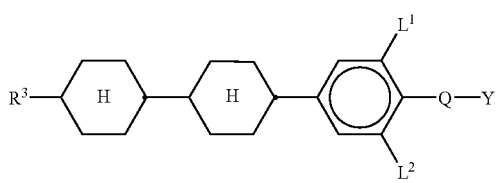

II* wherein
$R^3$ is an alkenyl group with 2 to 7 carbon atoms,
Q is $CF_2$, $OCF_2$, CFH, OCFH or a single bond,
Y is F or Cl, and
$L^1$ and $L^2$ are independently of each other H or F.

6. A liquid-crystalline medium according to claim 1, wherein said medium further comprises at least one compound selected from the following formulae

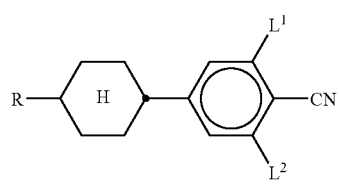

IIIb

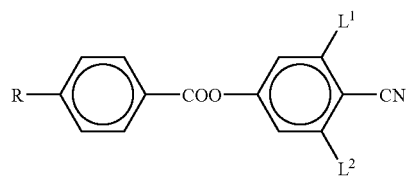

IIIc

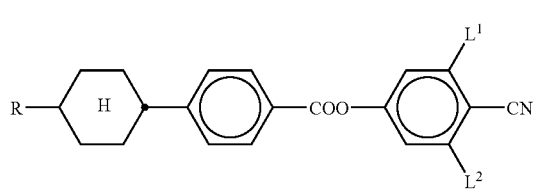

IIIf wherein
R is an alkyl, alkoxy or alkenyl group having from 1 to 12 carbon atoms, wherein one or more $CH_2$ groups are each, independently of one another, optionally replaced by —O—, —CH=CH—, —CO—, —OCO— or —COO— in such a way that O atoms are not linked directly to one another, and
$L^1$ and $L^2$ are independently of each other H or F.

7. A liquid-crystalline medium according to claim 1, wherein said medium further comprises at least one compound selected from the following formulae

IV24a

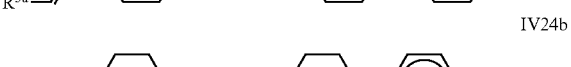

IV24b wherein $R^{3a}$ is H, $CH_3$, $C_2H_5$ or n-$C_3H_7$ and alkyl is an alkyl group with 1 to 8 carbon atoms.

8. A liquid-crystalline medium according to claim 1, wherein said medium further comprises at least one compound selected from the following formulae

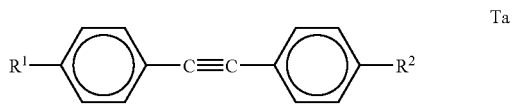

Ta

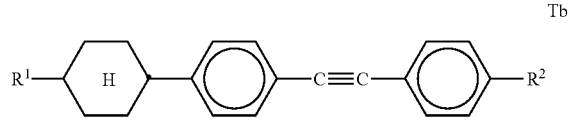

Tb

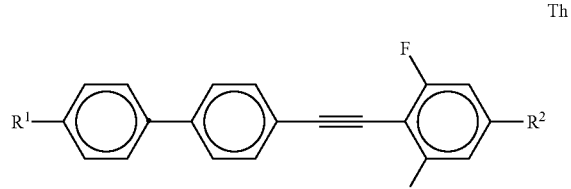

Th wherein
$R^1$ and $R^2$ are independently of each other an alkyl, alkoxy or alkenyl group having from 1 to 12 carbon atoms, wherein one or more $CH_2$ groups are each, independently of one another, optionally replaced by —O—, —CH=CH—, —CO—, —OCO— or —COO— in such a way that O atoms are not linked directly to one another.

9. A liquid-crystalline medium according to claim 1, wherein said medium comprises:
one or more compounds of formula I;
one or more compounds selected from formulae II,

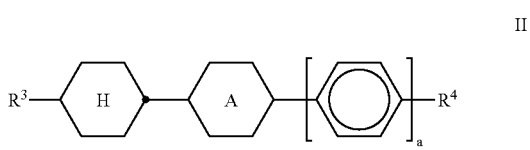

II in which
A is 1,4-phenylene or trans-1,4-cyclohexylene,
a is 0 or 1,
$R^3$ is an alkenyl group having from 2 to 9 carbon atoms, and
$R^4$ is an alkyl group having 1 to 12 carbon atoms which is unsubstituted, monosubstituted by CN or $CF_3$ or at least monosubstituted by halogen, and wherein one or more CH$_2$ groups are each, independently of one another, optionally replaced by —O—, —S—,

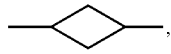

—CH=CH—, —C≡C—, —CO—, —CO—O—, —O—CO— or —O—CO—O— in such a way that O atoms are not linked directly to one another;

optionally one or more compounds of formula II*,

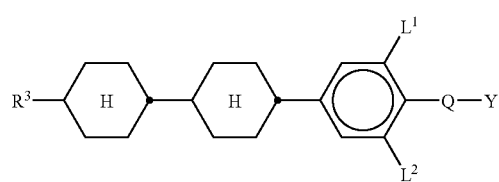

II* wherein
R$^3$ is an alkenyl group with 2 to 7 carbon atoms,
Q is CF$_2$, OCF$_2$, CFH, OCFH or a single bond,
Y is F or Cl, and
L$^1$ and L$^2$ are independently of each other H or F;
one or more compounds selected from formulae IIIa–IIIh,

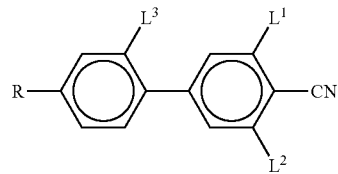

IIIa

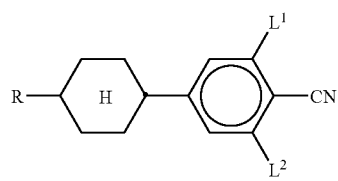

IIIb

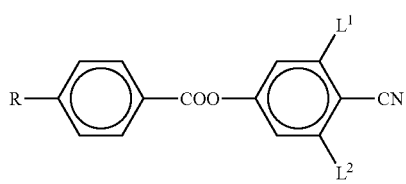

IIIc

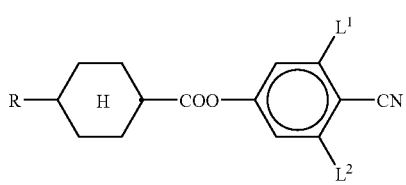

IIId

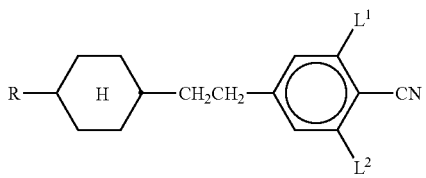

IIIe

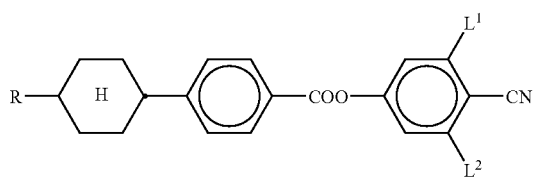

IIIf

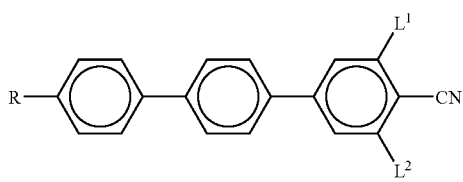

IIIg

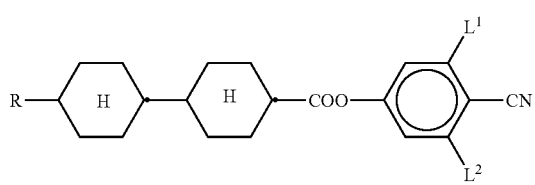

IIIh wherein
R is an alkyl, alkoxy or alkenyl group having from 1 to 12 carbon atoms, wherein one or more CH$_2$ groups are each, independently of one another, optionally replaced by —O—, —CH=CH—, —CO—, —OCO— or —COO— in such a way that O atoms are not linked directly to one another, and
L$^1$, L$^2$ and L$^3$ are independently of each other H or F;
one or more compounds selected of formulae Ta—Ti,

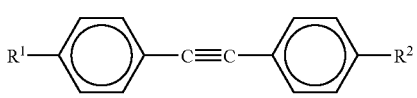

Ta

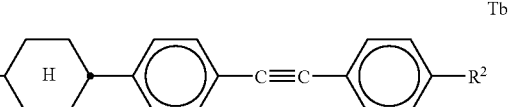

Tb

Tc

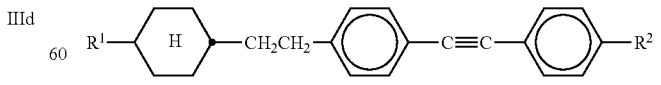

Td

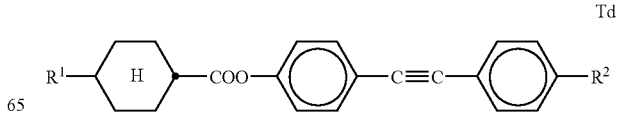

-continued

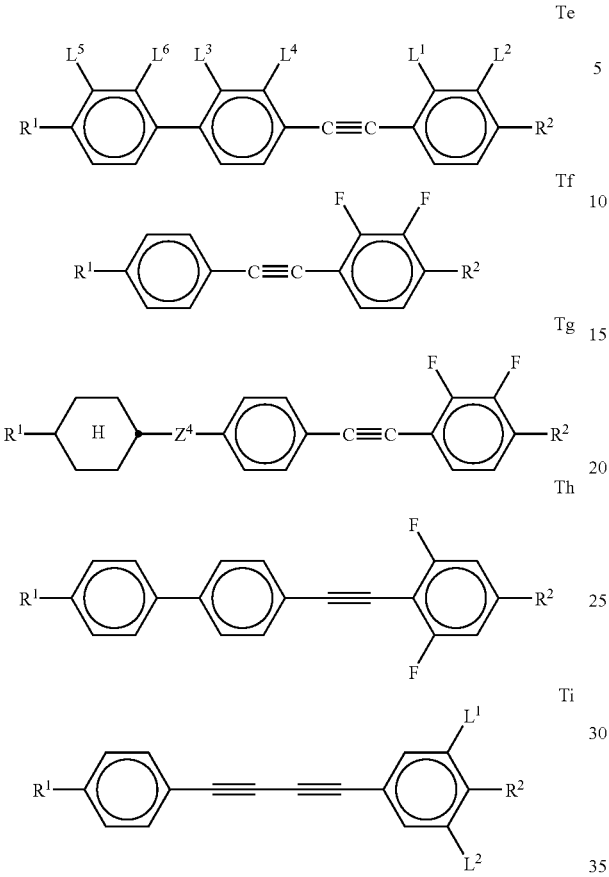

wherein
$R^1$ and $R^2$ are independently of each other an alkyl, alkoxy or alkenyl group having from 1 to 12 carbon atoms, wherein one or more $CH_2$ groups are each, independently of one another, optionally replaced by —O—, —CH=CH—, —CO—, —OCO— or —COO— in such a way that O atoms are not linked directly to one another,
$Z^4$ is —CO—O—, —$CH_2CH_2$— or a single bond, and
$L^1$ to $L^6$ are independently of each other H or F; and
optionally one or more compounds of formula IV24

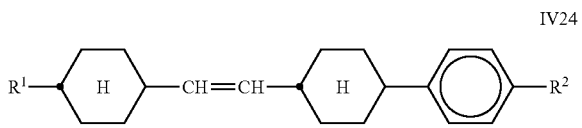

wherein
$R^1$ and $R^2$ are independently of each other an alkyl, alkoxy or alkenyl group having from 1 to 12 carbon atoms, wherein one or more $CH_2$ groups are each, independently of one another, optionally replaced by —O—, —CH=CH—, —CO—, —OCO— or —COO— in such a way that O atoms are not linked directly to one another.

10. A liquid-crystalline medium according to claim 1, wherein said medium comprises 5 to 30% of compounds of formula I;
10 to 50% of compounds selected from formula II and II*,

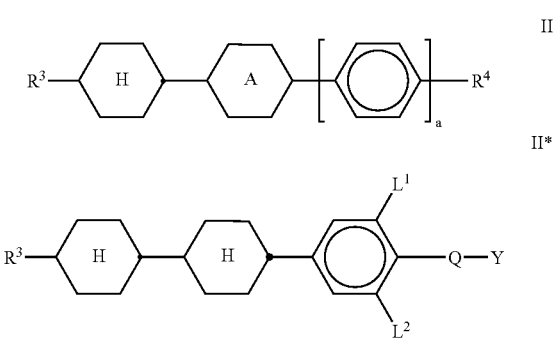

in which
A is 1,4-phenylene or trans-1,4-cyclohexylene,
a is 0 or 1,
$R^3$ in formula II is an alkenyl group having from 2 to 9 carbon atoms,
$R^3$ in formula II* is an alkenyl group with 2 to 7 carbon atoms,
$R^4$ is an alkyl group having 1 to 12 carbon atoms which is unsubstituted, monosubstituted by CN or $CF_3$ or at least monosubstituted by halogen, and wherein one or more $CH_2$ groups are each, independently of one another, optionally replaced by —O—, —S—,

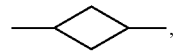

—CH=CH—, —C≡C—, —CO—, —CO—O—, —O—CO— or —O—CO—O— in such a way that O atoms are not linked directly to one another,
Q is $CF_2$, $OCF_2$, CFH, OCFH or a single bond,
Y is F or Cl, and
$L^1$ and $L^2$ are independently of each other H or F;

7 to 45% of compounds selected formula Ta, Tb and Th,

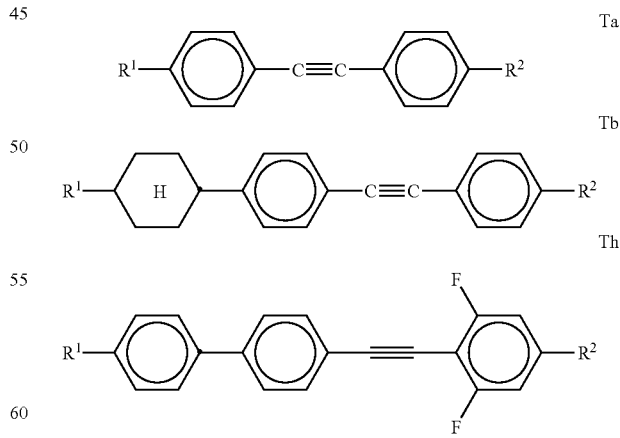

wherein
$R^1$ and $R^2$ are independently of each other an alkyl, alkoxy or alkenyl group having from 1 to 12 carbon atoms, wherein one or more $CH_2$ groups are each, independently of one another, optionally replaced by —O—, —CH=CH—, —CO—, —OCO— or —COO— in such a way that O atoms are not linked directly to one another;

2 to 25% of compounds selected from formula IV24a and IV24b,

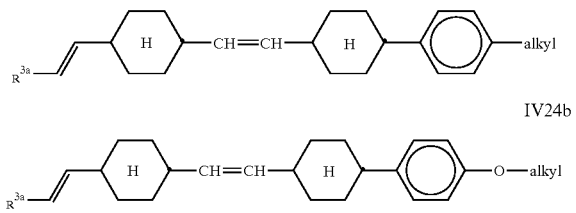

wherein $R^{3a}$ is H, CH$_3$, C$_2$H$_5$ or n-C$_3$H$_7$ and alkyl is an alkyl group with 1 to 8 carbon atoms; and 8 to 40% of compounds selected from formulae IIIa to IIIh

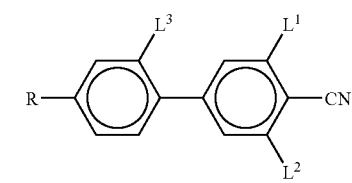

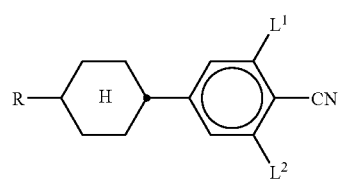

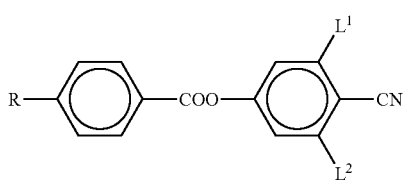

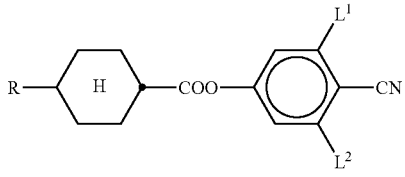

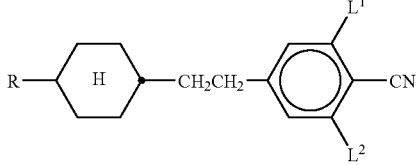

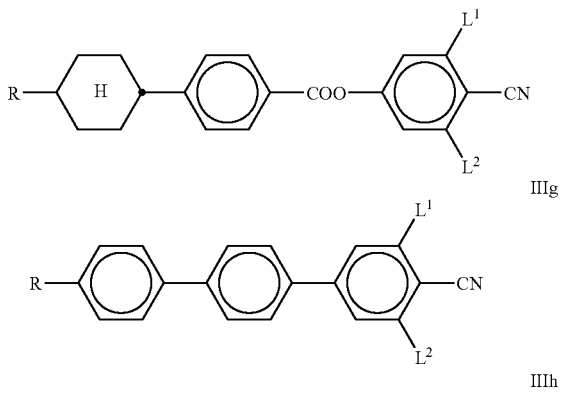

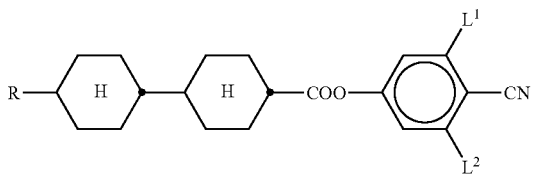

wherein
R is an alkyl, alkoxy or alkenyl group having from 1 to 12 carbon atoms, wherein one or more CH$_2$ groups are each, independently of one another, optionally replaced by —O—, —CH=CH—, —CO—, —OCO— or —COO— in such a way that O atoms are not linked directly to one another, and $L^1$, $L^2$ and $L^3$ are independently of each other H or F.

11. A liquid-crystalline medium according to claim 1, wherein said medium comprises 6 to 20% of compounds of formula I;
10 to 40% of compounds selected from formula II and II*,

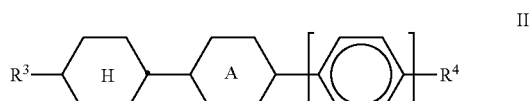

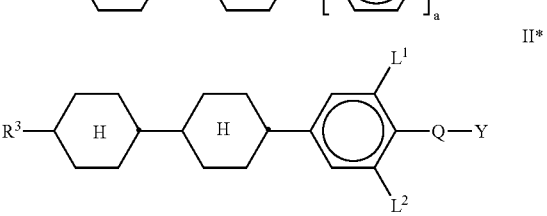

in which
A is 1,4-phenylene or trans-1,4-cyclohexylene,
a is 0 or 1,
$R^3$ in formula II is an alkenyl group having from 2 to 9 carbon atoms,
$R^3$ in formula II* is an alkenyl group with 2 to 7 carbon atoms,
$R^4$ is an alkyl group having 1 to 12 carbon atoms which is unsubstituted, monosubstituted by CN or CF$_3$ or at least monosubstituted by halogen, and wherein one or more CH$_2$ groups are each, independently of one another, optionally replaced by —O—, —S—,

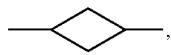

—CH=CH—, —C≡C—, —CO—, —CO—O—, —O—CO— or —C—CO—O— in such a way that C atoms are not linked directly to one another, Q is CF$_2$, OCF$_2$, CFH, OCFH or a single bond, Y is F or Cl, and L$^1$ and L$^2$ are independently of each other H or F;

10 to 30% of compounds selected formula Ta, Tb and Th,

Ta
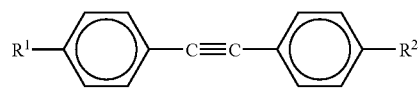

Tb
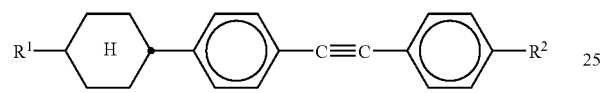

Th
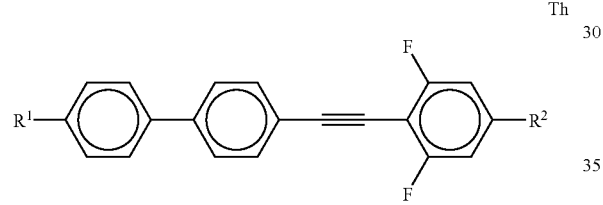

wherein

R$^1$ and R$^2$ are independently of each other an alkyl, alkoxy or alkenyl group having from 1 to 12 carbon atoms, wherein one or more CH$_2$ groups are each, independently of one another, optionally replaced by —O—, —CH=CH—, —CO—, —OCO— or —COO— in such a way that O atoms are not linked directly to one another;

3 to 20% of compounds selected from formula IV24a and IV24b,

IV24a
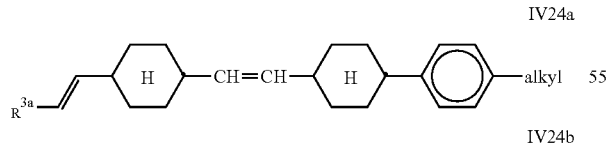

IV24b
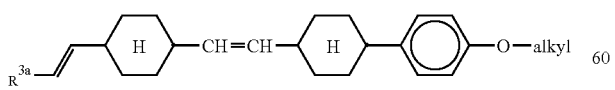

wherein R$^{3a}$ is H, CH$_3$, C$_2$H$_5$ or n-C$_3$H$_7$ and alkyl is an alkyl group with 1 to 8 carbon atoms; and 10 to 30% of compounds selected from formulae IIIa to IIIh IIIa
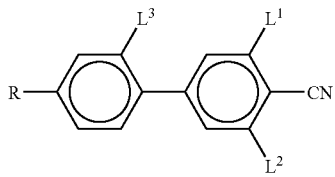

IIIb
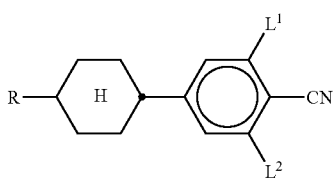

IIIc
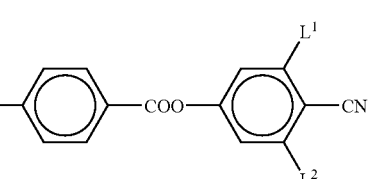

IIId
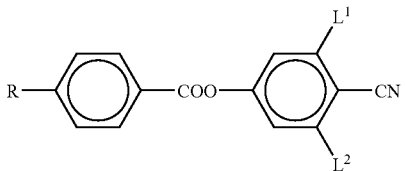

IIIe
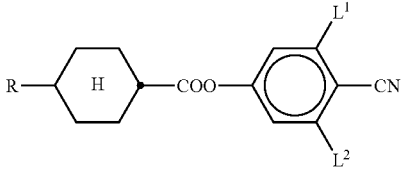

IIIf
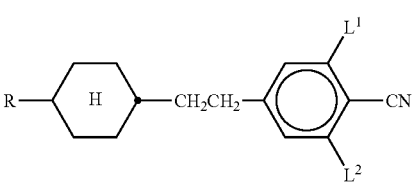

IIIg
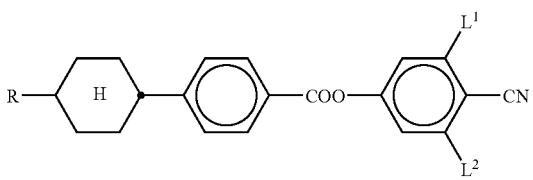

IIIh
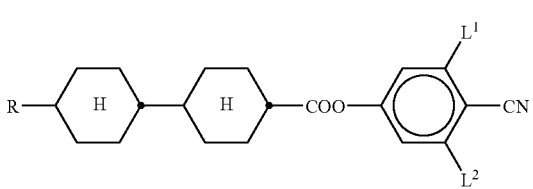

wherein
R is an alkyl, alkoxy or alkenyl group having from 1 to 12 carbon atoms, wherein one or more CH$_2$ groups are each, independently of one another, optionally replaced by —O—, —CH=CH—, —CO—, —OCO— or —COO— in such a way that O atoms are not linked directly to one another, and
L$^1$, L$^2$ and L$^3$ are independently of each other H or F.

12. A liquid-crystalline compound of formula I

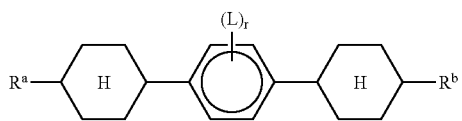

wherein
R$^a$ is an alkenyl group having from 2 to 9 carbon atoms,
R$^b$ is an alkyl group having 1 to 12 carbon atoms which is unsubstituted, monosubstituted by CN or CF$_3$ or at least monosubstituted by halogen, and wherein one or more CH$_2$ groups are each, independently of one another, optionally replaced by —O—, —S—,

—CH=CH—, —C≡C—, —CO—, —CO—O—, —O—CO— or —O—CO—O— in such a way that O atoms are not linked directly to one another,
L is, in each occurrence independently, F, Cl, CN or a mono- or polyhalogenated alkyl, alkoxy, alkenyl or alkenyloxy group having up to 3 carbon atoms, and
r is 2,
wherein the phenyl ring is substituted by L in 3- and 5-position.

13. A liquid-crystalline compound of formula I

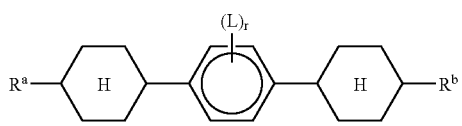

wherein
R$^a$ is an alkenyl group having from 2 to 9 carbon atoms,
R$^b$ is an alkyl group having 1 to 12 carbon atoms which is unsubstituted, monosubstituted by CN or CF$_3$ or at least monosubstituted by halogen, and wherein one or more CH$_2$ groups are each, independently of one another, optionally replaced by —O—, —S—,

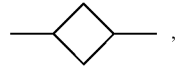

—CH=CH—, —C≡C—, —CO—, —CO—O—, —O—CO— or —O—CO— in such a way that O atoms are not linked directly to one another,
L is F, Cl, CN, CF$_3$, OCF$_3$ or OCH$_3$, and
r is 2, 3 or 4, wherein the phenyl ring is substituted by L in at least the 3- and 5-positions.

14. An electro-optical liquid-crystal display containing a liquid-crystalline medium according to claim 1.

15. An electro-optical liquid-crystal display containing a liquid-crystalline compound according to claim 12.

16. A TN or STN liquid-crystal display comprising:
two outer plates, which, together with a frame, form a cell,
a nematic liquid-crystal mixture of positive dielectric anisotropy located in the cell,
electrode layers with alignment layers on the insides of the outer plates,
a tilt angle between the longitudinal axis of the molecules at the surface of the outer plates and the outer plates of 0 to 30 degrees, and
a twist angle of the liquid-crystal mixture in the cell from alignment layer to alignment layer with a value of 22.5°–600°, and
a nematic liquid-crystal mixture comprising
a) 15–75% by weight of a liquid-crystalline component A consisting of one or more compounds having a dielectric anisotropy of greater than +1.5;
b) 25–85% by weight of a liquid-crystalline component B consisting of one or more compounds having a dielectric anisotropy of between −1.5 and +1.5;
c) 0–20% by weight of a liquid-crystalline component D consisting of one or more compounds having a dielectric anisotropy of below −1.5, and
d) if desired, an optically active component C in such an amount that the ratio between the layer thickness and the natural pitch of the chiral nematic liquid-crystal mixture is from about 0.2 to 1.3,
wherein said nematic liquid-crystal mixture is as defined in claim 1.

17. A liquid-crystalline medium comprising two or more liquid crystal compounds wherein at least one compound is of formula I

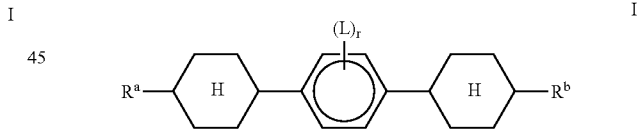

wherein
R$^a$ is an alkenyl group having from 2 to 9 carbon atoms,
R$^b$ is an alkyl group having 1 to 12 carbon atoms which is unsubstituted, monosubstituted by CN or CF$_3$ or at least monosubstituted by halogen, and wherein one or more CH$_2$ groups are each, independently of one another, optionally replaced by —O—, —S—, ⟨⟩, —CH=CH—, —C≡C—, —CO—, —CO—O—, —O—CO— or —O—CO—O— in such a way that O atoms are not linked directly to one another,
L is, in each occurrence independently, F, Cl, CN or an optionally mono- or polyhalogenated alkyl, alkoxy, alkenyl or alkenyloxy group having up to 3 carbon atoms, and
r is 0, 1, 2, 3 or 4; and
said medium further comprises at least one compound selected from the following formulae

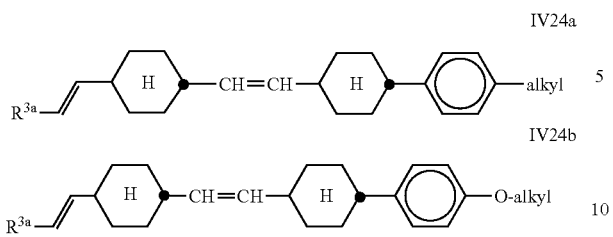

wherein $R^{3a}$ is H, CH$_3$, C$_2$H$_5$ or n-C$_3$H$_7$ and alkyl is an alkyl group with 1 to 8 carbon atoms.

18. A liquid-crystalline medium comprising:
at least one compound is of formula I

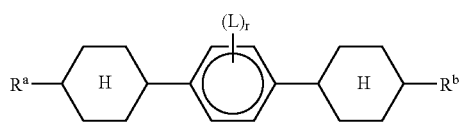

wherein
$R^a$ is an alkenyl group having from 2 to 9 carbon atoms,
$R^b$ is an alkyl group having 1 to 12 carbon atoms which is unsubstituted, monosubstituted by CN or CF$_3$ or at least monosubstituted by halogen, and wherein one or more CH$_2$ groups are each, independently of one another, optionally replaced by —O—, —S—, , —CH=CH—, —C≡C—, —CO—, —CO—O—, —O—CO— or —O—CO—O— in such a way that O atoms are not linked directly to one another,
L is, in each occurrence independently, F, Cl, CN or an optionally mono- or polyhalogenated alkyl, alkoxy, alkenyl or alkenyloxy group having up to 3 carbon atoms, and
r is 0, 1, 2, 3 or 4,
wherein said medium comprises 5 to 30% of compounds of formula I;
said medium further comprising 10 to 50% of compounds selected from formula II and II*,

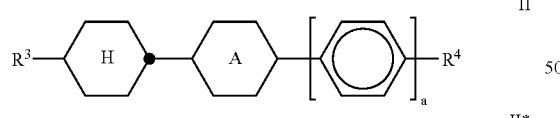

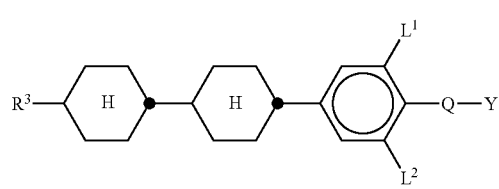

wherein
A is 1,4-phenylene or trans-1,4-cyclohexylene,
a is 0 or 1,
$R^3$ in formula II is an alkenyl group having from 2 to 9 carbon atoms,
$R^3$ in formula II* is an alkenyl group with 2 to 7 carbon atoms, $R^4$ is an alkyl group having 1 to 12 carbon atoms which is unsubstituted, monosubstituted by CN or CF$_3$ or at least monosubstituted by halogen, and wherein one or more CH$_2$ groups are each, independently of one another, optionally replaced by —O—, —S—,

—CH=CH—, —C≡C—, —CO—, —CO—O—, —O—CO— or —O—CO—O— in such a way that O atoms are not linked directly to one another,
Q is CF$_2$, OCF$_2$, CFH, OCFH or a single bond,
Y is F or Cl, and
L$^1$ and L$^2$ are independently of each other H or F;
said medium further comprises 7 to 45% of compounds selected formula Ta, Tb and Th,

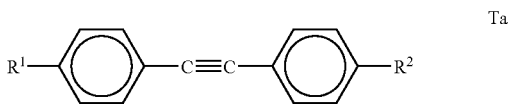

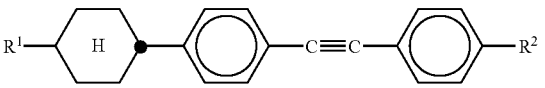

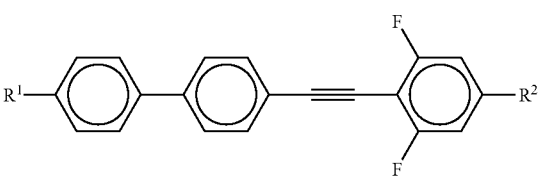

wherein
$R^1$ and $R^2$ are independently of each other an alkyl, alkoxy or alkenyl group having from 1 to 12 carbon atoms, wherein one or more CH$_2$ groups are each, independently of one another, optionally replaced by —O—, —CH=CH—, —CO—, —OCO— or —COO— in such a way that O atoms are not linked directly to one another;
said medium further comprises 2 to 25% of compounds selected from formula IV24a and IV24b,

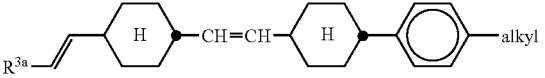

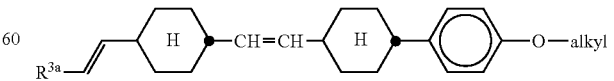

wherein $R^{3a}$ is H, CH$_3$, C$_2$H$_5$ or n-C$_3$H$_7$ and alkyl is an alkyl group with 1 to 8 carbon atoms; and
said medium further comprises 8 to 40% of compounds selected from formulae IIIa to IIIh

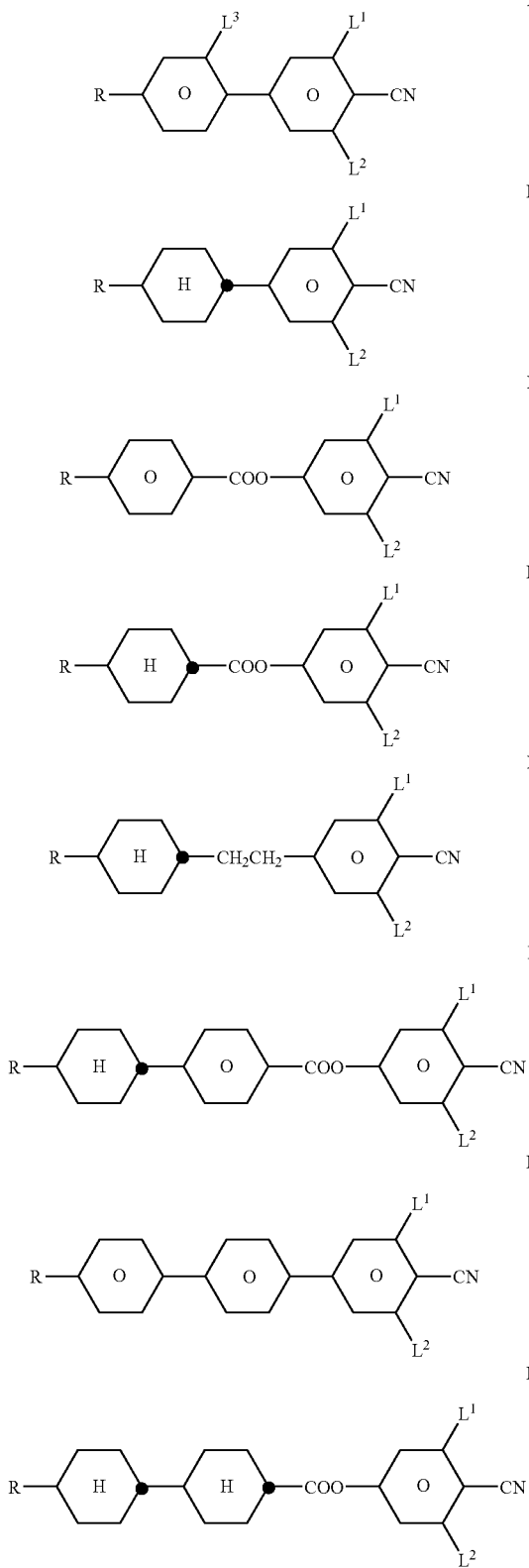

wherein
R is an alkyl, alkoxy or alkenyl group having from 1 to 12 carbon atoms, wherein one or more CH₂ groups are each, independently of one another, optionally replaced by —O—, —CH=CH—, —CO—, —OCO— or —COO— in such a way that O atoms are not linked directly to one another, and
$L^1$, $L^2$ and $L^3$ are independently of each other H or F.

19. A liquid-crystalline medium comprising:
at least one compound is of formula I

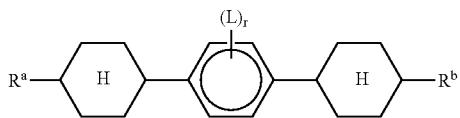

wherein
$R^a$ is an alkenyl group having from 2 to 9 carbon atoms,
$R^b$ is an alkyl group having 1 to 12 carbon atoms which is unsubstituted, monosubstituted by CN or CF₃ or at least monosubstituted by halogen, and wherein one or more CH₂ groups are each, independently of one another, optionally replaced by —O—, —S—,

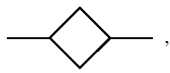

—CH=CH—, —C≡C—, —CO—, —CO—O—, —O—CO— or —O—CO—O— in such a way that O atoms are not linked directly to one another,
L is, in each occurrence independently, F, Cl, CN or an optionally mono- or polyhalogenated alkyl, alkoxy, alkenyl or alkenyloxy group having up to 3 carbon atoms, and
r is 0, 1, 2, 3 or 4,
wherein said medium comprises 6 to 20% of compounds of formula I;
said medium further comprising 10 to 40% of compounds selected from formula II and II*,

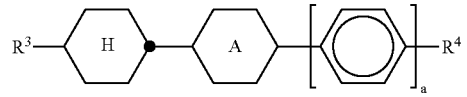

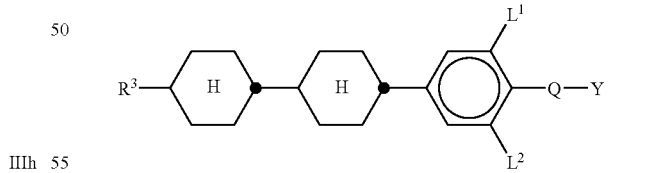

in which
A is 1,4-phenylene or trans-1,4-cyclohexylene,
a is 0 or 1,
$R^3$ in formula II is an alkenyl group having from 2 to 9 carbon atoms,
$R^3$ in formula II* is an alkenyl group with 2 to 7 carbon atoms,
$R^4$ is an alkyl group having 1 to 12 carbon atoms which is unsubstituted, monosubstituted by CN or CF₃ or at least monosubstituted by halogen, and wherein one or more CH$_2$ groups are each, independently of one another, optionally replaced by —O—, —S—,

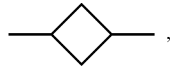

—CH═CH—, —C≡C—, —CO—, —CO—O—, —O—CO— or —O—CO—O— in such a way that O atoms are not linked directly to one another, Q is CF$_2$, OCF$_2$, CFH, OCFH or a single bond, Y is F or Cl, and L$^1$ and L$^2$ are independently of each other H or F;

said medium further comprising 10 to 30% of compounds selected formula Ta, Tb and Th, Ta
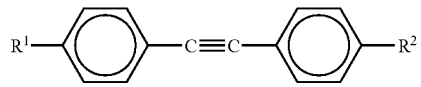

Tb
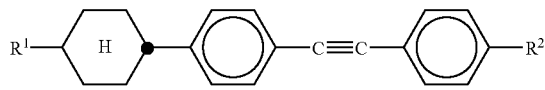

Th
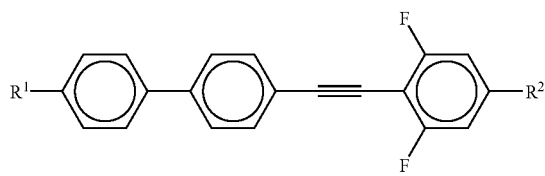

wherein

R$^1$ and R$^2$ are independently of each other an alkyl, alkoxy or alkenyl group having from 1 to 12 carbon atoms, wherein one or more CH$_2$ groups are each, independently of one another, optionally replaced by —O—, —CH═CH—, —CO—, —OCO— or —COO— in such a way that O atoms are not linked directly to another;

said medium further comprising 3 to 20% of compounds selected from formula IV24a and IV24b, IV24a
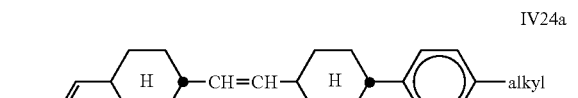

IV24b
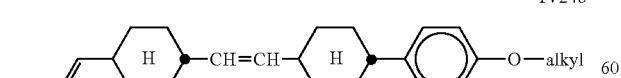

wherein R$^{3a}$ is H, CH$_3$, C$_2$H$_5$ or n-C$_3$H$_7$ and alkyl is an alkyl group with 1 to 8 carbon atoms; and said medium further comprising 10 to 30% of compounds selected from formulae IIIa to IIIh IIIa
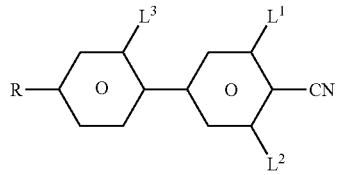

IIIb
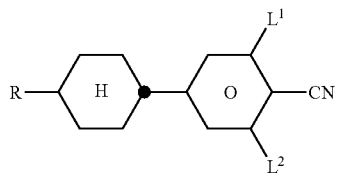

IIIc
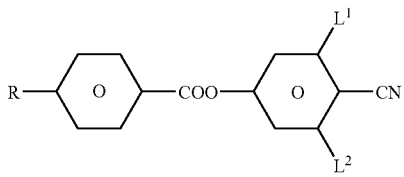

IIId
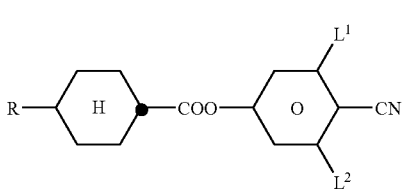

IIIe
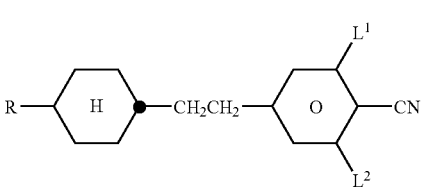

IIIf
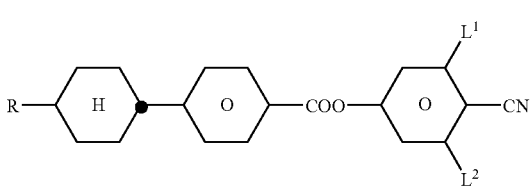

IIIg
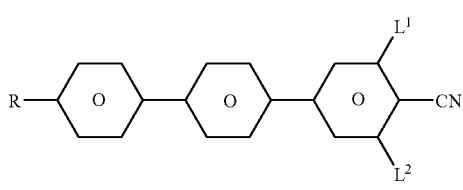

IIIh
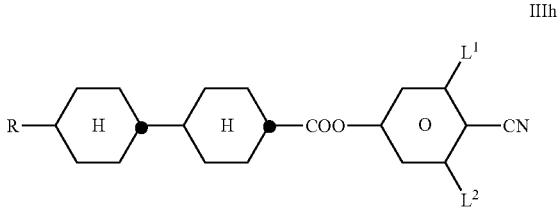

wherein

R is an alkyl, alkoxy or alkenyl group having from 1 to 12 carbon atoms, wherein one or more CH$_2$ groups are each, independently of one another, optionally replaced by —O—, —CH=CH—, —CO—, —OCO— or —COO— in such a way that O atoms are not linked directly to one another, and L¹, L² and L³ are independently of each other H or F.

20. A compound of the formula

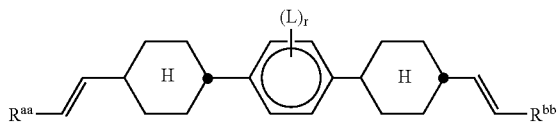

wherein r is 1, 2, 3 or 4, L is, in each occurrence independently, F, Cl, CN or an optionally mono- or polyhalogenated alkyl, alkoxy, alkenyl or alkenyloxy group having up to 3 carbon atoms, and $R^{aa}$ and $R^{bb}$ are each $CH_3$.

21. The compound of the formula

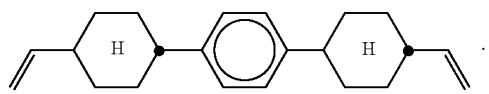

22. An electro-optical liquid-crystal display containing a compound according to claim 20.

23. An electro-optical liquid-crystal display containing a liquid-crystalline compound according to claim 21.

24. A liquid-crystalline medium according to claim 1, wherein $R^a$ is vinyl, prop-1-enyl, prop-2-enyl, but-1-enyl, but-2-enyl, but-3-enyl, pent-1-enyl, pent-2-enyl, pent-3-enyl or pent-4-enyl.

25. A liquid-crystalline medium according to claim 1, wherein $R^b$ is vinyl, prop-1-enyl, prop-2-enyl, but-1-enyl, but-2-enyl, but-3-enyl, pent-1-enyl, pent-2-enyl, pent-3-enyl or pent-4-enyl.

26. A liquid-crystalline medium according to claim 24, wherein $R^b$ is vinyl, prop-1-enyl, prop-2-enyl, but-1-enyl, but-2-enyl, but-3-enyl, pent-1-enyl, pent-2-enyl, pent-3-enyl or pent-4-enyl.

27. A liquid-crystalline medium according to claim 1, wherein at least one of $R^a$ and $R^b$ is hex-1-enyl, hex-2-enyl, hex-3-enyl, hex-4-enyl, hex-5-enyl, hept-1 -enyl, hept-2-enyl, hept-3-enyl, hept-4-enyl, hept-5-enyl, hept-6-enyl, oct-1-enyl, oct-2-enyl, oct-3-enyl, oct-4-enyl, oct-5-enyl, oct-6-enyl, oct-7-enyl, non-1-enyl, non-2-enyl, non-3-enyl, non-4-enyl, non-5-enyl, non-6-enyl, non-7-enyl or non-8-enyl.

28. A liquid-crystalline medium according to claim 1, wherein at least one of $R^a$ and $R^b$ is 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, or 6-heptenyl.

29. A compound according to claim 12, wherein L is F, Cl, CN, $CF_3$, or $OCF_3$.

30. A compound according to claim 12, wherein $R^b$ is alkenyl with 2 to 9 carbon atoms.

31. A compound according to claim 29, wherein $R^b$ is alkenyl with 2 to 9 carbon atoms.

32. A liquid-crystalline medium, comprising two or more liquid crystal compounds wherein at least one compound is of formula I

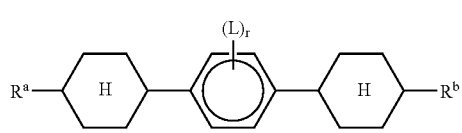

wherein
$R^a$ is an alkenyl group having from 2 to 9 carbon atoms,
$R^b$ is an alkyl group having 1 to 12 carbon atoms which is unsubstituted, monosubstituted by CN or $CF_3$ or at least monosubstituted by halogen, and wherein one or more $CH_2$ groups are each, independently of one another, optionally replaced by —O—, —S—, -◇-, —CH=CH—, —C≡C—, —CO—, —CO—O—, —O—CO— or —O—CO—O— in such a way that O atoms are not linked directly to one another,
L is, in each occurrence independently, F, Cl, CN or an optionally mono- or polyhalogenated alkyl, alkoxy, alkenyl or alkenyloxy group having up to 3 carbon atoms, and
r is 2; and
wherein the phenyl ring is substituted by L in 3- and 5-position.

33. A liquid-crystalline medium according to claim 1, wherein said medium comprises at least one compound of formula I selected from the following formulae

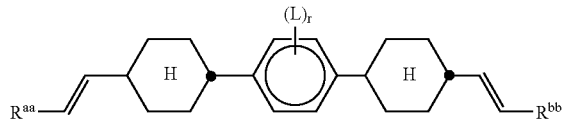

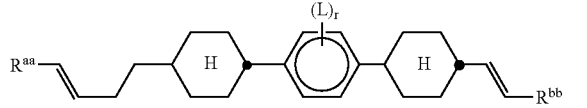

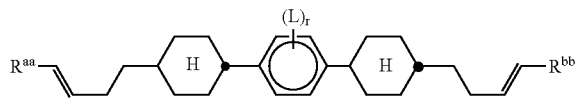

wherein $R^{aa}$ and $R^b$ are independently of each other H, $CH_3$, $C_2H_5$ or $n$-$C_3H_7$.

* * * * *

UNITED STATES PATENT AND TRADEMARK OFFICE
CERTIFICATE OF CORRECTION

PATENT NO.       : 7,041,347 B2                                         Page 1 of 1
APPLICATION NO.  : 10/777201
DATED            : May 9, 2006
INVENTOR(S)      : Hirschmann et al.

It is certified that error appears in the above-identified patent and that said Letters Patent is hereby corrected as shown below:

On the front page, Section (75) Inventors: line 5, reads "Hampshire" should read
-- Ringwood --
Column 39, line 65, reads "medium, comprising" should read -- medium comprising --
Column 42, line 51, reads "from formulae II," should read -- from formula II, --
Column 44, line 40, reads "each , independently" should read -- each, independently --
Column 44, line 46, reads "selected of" should read -- selected from --
Column 46, line 42, reads "selected formula" should read -- selected from formulae --
Column 49, line 8, reads "that C atoms" should read -- that O atoms --
Column 49, line 15, reads "selected formula" should read -- selected from formulae --
Column 51, line 4, reads "each , independently" should read -- each, independently --
Column 51, line 64, reads "-O-CO- or –O-CO-" should read -- -O-CO- or –O-CO-O- --
Column 53, line 16, reads "is of formula" should read -- of formula --
Column 53, line 35, remove line break after "linked"
Column 54, line 20, reads "selected formula" should read -- selected from formulae --
Column 56, line 7, reads "is of formula" should read -- of formula --
Column 57, line 18, reads "selected formula" should read -- selected from formulae --
Column 60, line 54, reads "$R^b$" should read -- $R^{bb}$ --

Signed and Sealed this

Seventeenth Day of November, 2009

David J. Kappos
*Director of the United States Patent and Trademark Office*